(12) United States Patent
Ulichney et al.

(10) Patent No.: US 9,665,813 B2
(45) Date of Patent: May 30, 2017

(54) DATA-BEARING MEDIA

(71) Applicant: HEWLETT-PACKARD DEVELOPMENT COMPANY, L.P., Houston, TX (US)

(72) Inventors: Robert Ulichney, Andover, MA (US); Matthew D Gaubatz, Seattle, WA (US); Steven J Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 15 days.

(21) Appl. No.: 14/654,108

(22) PCT Filed: Jan. 30, 2013

(86) PCT No.: PCT/US2013/023729
§ 371 (c)(1),
(2) Date: Jun. 19, 2015

(87) PCT Pub. No.: WO2014/120138
PCT Pub. Date: Aug. 7, 2014

(65) Prior Publication Data
US 2015/0356392 A1 Dec. 10, 2015

(51) Int. Cl.
*G06K 19/06* (2006.01)
*G06K 19/00* (2006.01)
*H04N 1/32* (2006.01)
*H04N 1/405* (2006.01)

(52) U.S. Cl.
CPC ....... *G06K 19/00* (2013.01); *G06K 19/06037* (2013.01); *G06K 19/06196* (2013.01); *H04N 1/32144* (2013.01); *H04N 1/32288* (2013.01); *H04N 1/32293* (2013.01); *H04N 1/32304* (2013.01); *H04N 1/4051* (2013.01); *H04N 1/32256* (2013.01)

(58) Field of Classification Search
CPC ............. G06K 19/00; G06K 19/06037; G06K 19/06196; H04N 1/32144; H04N 1/32288; H04N 1/32293; H04N 1/32304; H04N 1/4051; H04N 1/32256
USPC ........ 235/435, 494, 493, 487, 462.1, 462.25
See application file for complete search history.

(56) References Cited

U.S. PATENT DOCUMENTS

| 6,078,451 | A | 6/2000 | Ioki | |
| 6,296,192 | B1 * | 10/2001 | Hecht | G06K 7/143 235/454 |
| 6,885,756 | B2 | 4/2005 | Kitamura | |

(Continued)

FOREIGN PATENT DOCUMENTS

DE 10211982 A1 10/2003

OTHER PUBLICATIONS

Prabhakaran, N. et al, "A New Cryptic Stenanographic Approach Using Video Steganography", Jul. 24, 2012.

*Primary Examiner* — Paultep Savusdiphol
(74) *Attorney, Agent, or Firm* — Leffert Jay & Polglaze, PA

(57) ABSTRACT

A data-bearing medium has an array of data-bearing elements. The array of data-bearing elements represents an array of bits. A certain number of the bits repeat within the array of bits. Positions of the bits in each row of the array of bits are circularly shifted from positions of the bits in an immediately preceding row.

16 Claims, 21 Drawing Sheets

(56) References Cited

U.S. PATENT DOCUMENTS

| | | |
|---|---|---|
| 7,145,556 B2 * | 12/2006 | Pettersson ........... G06F 3/03545 178/19.01 |
| 7,528,993 B2 | 5/2009 | Rosen |
| 7,999,798 B2 * | 8/2011 | Pettersson ........... G06F 3/03545 178/18.01 |
| 2001/0037455 A1 | 11/2001 | Lawandy |
| 2002/0116677 A1 | 8/2002 | Morelos-Zaragoza |
| 2002/0191318 A1 | 12/2002 | Satoh |
| 2003/0043412 A1 | 3/2003 | Roylance |
| 2003/0085884 A1 | 5/2003 | Pettersson |
| 2005/0259820 A1 | 11/2005 | Jones |
| 2006/0109286 A1 | 5/2006 | Damera-Venkata |
| 2006/0133877 A1 * | 6/2006 | Lynggaard ............. G06K 15/02 400/62 |
| 2006/0242562 A1 * | 10/2006 | Wang .................... G06F 3/0321 715/210 |
| 2007/0064818 A1 * | 3/2007 | Pettersson ........... G06F 3/03545 375/246 |
| 2007/0272750 A1 * | 11/2007 | Bjorklund ........... G06F 3/03545 235/435 |
| 2008/0226125 A1 | 9/2008 | Van Leest |
| 2010/0284563 A1 | 11/2010 | Miller |
| 2011/0069328 A1 | 3/2011 | Ulichney |
| 2012/0177096 A1 | 7/2012 | Yano |
| 2012/0281920 A1 | 11/2012 | Ulichney |

* cited by examiner

| Shift | $b_3$ | $b_2$ | $b_1$ | $b_0$ | Decimal Value |
|---|---|---|---|---|---|
| 0 | 1 | 1 | 0 | 0 | 12 |
| 1 | 0 | 1 | 1 | 0 | 6 |
| 2 | 0 | 0 | 1 | 1 | 3 |
| 3 | 1 | 0 | 0 | 1 | 9 |

FIG. 2A

| Shift | $b_3$ | $b_2$ | $b_1$ | $b_0$ | Decimal Value |
|---|---|---|---|---|---|
| 0 | 1 | 0 | 1 | 0 | 10 |
| 1 | 0 | 1 | 0 | 1 | 5 |
| 2 | 1 | 0 | 1 | 0 | 10 |
| 3 | 0 | 1 | 0 | 1 | 5 |

FIG. 2B

| Shift | $b_{15}$ | $b_{14}$ | $b_{13}$ | $b_{12}$ | $b_{11}$ | $b_{10}$ | $b_9$ | $b_8$ | $b_7$ | $b_6$ | $b_5$ | $b_4$ | $b_3$ | $b_2$ | $b_1$ | $b_0$ | Decimal Value |
|---|---|---|---|---|---|---|---|---|---|---|---|---|---|---|---|---|---|
| 0  | 1 | 0 | 1 | 1 | 0 | 0 | 1 | 0 | 0 | 0 | 0 | 0 | 1 | 0 | 1 | 0 | 45578 |
| 1  | 0 | 1 | 0 | 1 | 1 | 0 | 0 | 1 | 0 | 0 | 0 | 0 | 0 | 1 | 0 | 1 | 22789 |
| 2  | 1 | 0 | 1 | 0 | 1 | 1 | 0 | 0 | 1 | 0 | 0 | 0 | 0 | 0 | 1 | 0 | 44162 |
| 3  | 0 | 1 | 0 | 1 | 0 | 1 | 1 | 0 | 0 | 1 | 0 | 0 | 0 | 0 | 0 | 1 | 22081 |
| 4  | 1 | 0 | 1 | 0 | 1 | 0 | 1 | 1 | 0 | 0 | 1 | 0 | 0 | 0 | 0 | 0 | 43808 |
| 5  | 0 | 1 | 0 | 1 | 0 | 1 | 0 | 1 | 1 | 0 | 0 | 1 | 0 | 0 | 0 | 0 | 21904 |
| 6  | 0 | 0 | 1 | 0 | 1 | 0 | 1 | 0 | 1 | 1 | 0 | 0 | 1 | 0 | 0 | 0 | 10952 |
| 7  | 0 | 0 | 0 | 1 | 0 | 1 | 0 | 1 | 0 | 1 | 1 | 0 | 0 | 1 | 0 | 0 | 5476 |
| 8  | 0 | 0 | 0 | 0 | 1 | 0 | 1 | 0 | 1 | 0 | 1 | 1 | 0 | 0 | 1 | 0 | 2738 |
| 9  | 0 | 0 | 0 | 0 | 0 | 1 | 0 | 1 | 0 | 1 | 0 | 1 | 1 | 0 | 0 | 1 | 1369 |
| 10 | 1 | 0 | 0 | 0 | 0 | 0 | 1 | 0 | 1 | 0 | 1 | 0 | 1 | 1 | 0 | 0 | 33452 |
| 11 | 0 | 1 | 0 | 0 | 0 | 0 | 0 | 1 | 0 | 1 | 0 | 1 | 0 | 1 | 1 | 0 | 16726 |
| 12 | 0 | 0 | 1 | 0 | 0 | 0 | 0 | 0 | 1 | 0 | 1 | 0 | 1 | 0 | 1 | 1 | 8363 |
| 13 | 1 | 0 | 0 | 1 | 0 | 0 | 0 | 0 | 0 | 1 | 0 | 1 | 0 | 1 | 0 | 1 | 36949 |
| 14 | 1 | 1 | 0 | 0 | 1 | 0 | 0 | 0 | 0 | 0 | 1 | 0 | 1 | 0 | 1 | 0 | 51242 |
| 15 | 0 | 1 | 1 | 0 | 0 | 1 | 0 | 0 | 0 | 0 | 0 | 1 | 0 | 1 | 0 | 1 | 25621 |

|  Shift |  | $b_3$ | $b_2$ | $b_1$ | $b_0$ | Decimal Value |
|---|---|---|---|---|---|---|
| 0 | $P^* =$ | 0 | 1 | 1 | 0 | 6 |
| 1 | $S =$ | 0 | 0 | 1 | 1 | 3 |
| 2 |  | 1 | 0 | 0 | 1 | 9 |
| 3 | $P =$ | 1 | 1 | 0 | 0 | 12 |

FIG. 12

DATA-BEARING MEDIA

BACKGROUND

Non-limiting examples of data-bearing media might include data-bearing magnetic media (e.g., magnetic storage), data-bearing optical media (e.g., optical storage), data-bearing atomic media (e.g., atomic storage), data-bearing images, etc. For example, data-bearing images might include data-bearing halftone images (e.g., steganographic halftone images), graphical alpha-numerics, barcodes, etc.

BRIEF DESCRIPTION OF THE DRAWINGS

FIG. 2A is an example of the right circular shifts of a string of data.

FIG. 2B is an example of the right circular shifts of another string of data.

FIG. 3 is an example of the right circular shifts of another string of data.

FIG. 4 is an example of a two-dimensional array of data bits.

FIG. 6 is an example illustrating the positions of the bits in the two-dimensional array of data bits in FIG. 4.

FIGS. 11A-11D illustrate an example of determining a version of a payload.

FIG. 12 is an example of the right circular shifts of a string of data.

DETAILED DESCRIPTION

Figure 1:
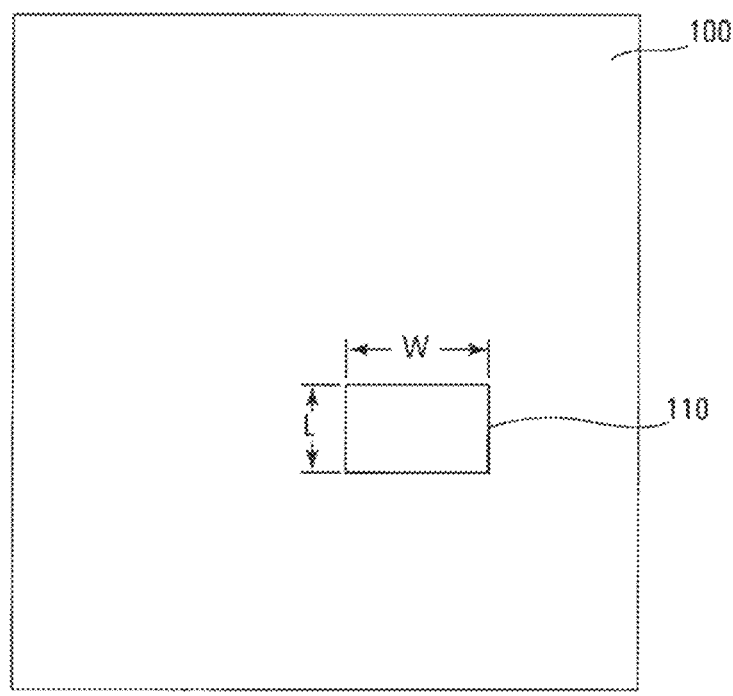
FIG. 1 is an example of a data-bearing medium.

In the following detailed description, reference is made to the accompanying drawings that form a part hereof, and in which is shown, by way of illustration, specific examples. Process, logical, and electrical changes may be made without departing from the scope of the present disclosure. The following detailed description is, therefore, not to be taken in a limiting sense.

Data (e.g., that may be referred to as a payload) can be encoded in an array of data-bearing elements in a data-bearing medium that can be read by a data recovery system. Data-bearing media, such as, data-bearing halftones (e.g., steganographic halftone images), graphical alpha-numerics, barcodes, etc., are examples of data-bearing images, where the data-bearing elements might be symbols that encode the payload.

Some data-bearing media, such as data-bearing halftone images, may be used to encode a payload in an original grayscale image (e.g., a source image), such as a photograph, graphic, text, or an area, such as the background of a page. For example, steganographic halftones (e.g., stegatones), can be used to encode a payload in the halftone of an image, e.g., using techniques, such as cluster-dot halftoning. A cluster-dot halftoning process might take any grayscale image and a payload to be encoded therein as an input and produce a bi-tonal clustered-dot halftone of the grayscale image with selected halftone clusters shifted to carry a number of bits of the payload. For example, a certain bit can be represented by a certain shift in the center of a halftone cluster.

In atomic data-bearing media, for example, a data-bearing element might be an extra atom that represents a bit value, such as a one, while another data-bearing-element might be a vacant area that represents another bit value, such as a zero. Data-bearing elements in magnetic data-bearing media might include magnetized areas, e.g., different magnetisms might encode different bit values. For example, the different magnetic spin polarities of atoms might encode different bit values. Data-bearing elements in optical data-bearing media might include areas of different reflectance; e.g., regions of relatively low reflectance (e.g., black regions or depressions) might encode ones, whereas regions at relatively high reflectance (e.g., white regions or elevated regions) might encode zeros.

Recovering data from some data-bearing media may involve capturing an entire array of data-bearing elements, such as an entire data-bearing medium. However, some data-recovery systems might use capture devices having fields of view that are smaller than an entire data-bearing medium, meaning that only a portion of the data-bearing medium can be captured.

In an example, an array of data-bearing elements of a data-bearing medium might represent an array of bits, where a certain number of the bits in the array of bits repeat and where positions of the bits in each row of the array of bits are circularly shifted from positions of the bits in an immediately preceding row. For example, the certain number of the bits in the array of bits might be a circularly shifted version of a payload of the data-bearing medium. The positions of the bits in each row of the array of bits may be circularly shifted from the positions of the bits in an immediately preceding row by a number of positions that is an integer multiple of a number of bit positions by which the bits in the certain number the of bits is shifted from bits in a payload of the data-bearing medium, for example.

This allows a portion of the data-bearing medium to include at least a shifted version of the payload and the row-to-row shift, meaning that the shifted version of the payload and the row-to-row shift can be determined from the portion of the data-bearing medium, for example. The payload can then be recovered by shifting the shifted version by an integer multiple of the row-to-row shift, for example.

This advantageously allows a payload to be recovered from a portion of the data-bearing medium without the need to capture the entire data-bearing medium, for example.

As such, capture devices having fields of view that are smaller than an entire data-bearing medium, such as a data-bearing image, are advantageously enabled. For example, the encoding of the bits of a payload without needing a lookup table during decoding, e.g., as is sometimes used in existing data-recovery systems, is advantageously allowed.

FIG. 11 illustrates a data-bearing medium 100, such as a data-bearing optical, magnetic, or atomic medium or a data-bearing image, such as a data-bearing halftone image, e.g., a stegatone, a graphical alpha-numeric, a barcode, etc. Data-bearing medium 100 may be used to encode a payload P, e.g., information, such as data, in an original grayscale image (e.g., a source image), such as a photograph, graphic, text, or an area, such as the background of a page, e.g., that might include a void pantograph. For example, the payload might be in the form of a string of bits (e.g., a bit code), such as ones and zeros, where each bit in the string might be encoded in one data-bearing element data-bearing medium (e.g., encoded in one symbol in a data-bearing image).

For example, the payload might be repeated throughout the data-bearing medium. The repeating payload might have a certain number (B) of bits, for example. The payload may be recovered from a region 110 that is a portion (e.g., a subset), such as a crop, of data-bearing medium 100, e.g., without any knowledge of the original image, for example. For example, region 110 might be the size of an image-capture area of an image-capturing device, such as a CID (charge injection device) camera, used by a payload recovery system that can be used to recover the payload from a data-bearing medium. Alternatively, the size of region 110 may be equal to or greater than the image 100.

In an example, the payload string of bits might be encoded using a string of bits formed by circularly shifting (e.g., by right circularly shifting) the bit positions of the bits in payload string of bits. For example, FIG. 2A shows how a payload string of bits P=1100 (e.g. where B=4) might be right circularly shifted, where "shift" is the number of bit positions by which the bits in the payload are right circularly shifted. For example, FIG. 2A gives each shifted version of the payload.

Note that the bit positions $b_3$ to $b_0$ respectively denote the most to the least significant bit positions in FIG. 2A, where bit position $b_3$ is the most significant bit position in FIG. 2A and bit position $b_0$ is the least significant bit position in FIG. 2A. In an example, the string of bits 1100 may be an encrypted version of the payload.

For each right circular shift of one bit, each bit is moved one bit position to the right, and the bit in the last position on the right (e.g., in the rightmost position) is moved to the first position (e.g., the leftmost position). Note that for a shift of two, the bits 10 respectively in the positions $b_2$ and $b_1$ in the payload 1100 are respectively moved to the bit positions $b_0$ and $b_3$.

In an example, the payload string of bits might be encoded using the shifted version of the payload having the lowest decimal value of all possible shifts of the payload string of bits. For example, the shifted version of the payload having the lowest decimal value of all possible shifts of the payload string of bits might be referred to as the standard form (e.g., standard phase) S of the payload. Therefore, for the example of FIG. 2A, the payload P=1100 might be encoded using the shifted version S=0011, corresponding to a right circular shift of two bit positions. Note that in the example of FIG. 2, each shift causes the bit value in every bit position to change, meaning that each shifted bit string can have a different decimal value in FIG. 2A. Note further that each shifted bit string has B=4 bits in FIG. 2A.

Note that the shifted versions of some payloads may have the same value. A payload P=1010 is one such example, as is shown in FigureError! Reference source not found. 2B. Note that the standard form S=0101 can be achieved with a right circular shift of 1 or 3, and if does not matter which one is used to encode the payload P=1010 in FIG. 2B.

FIG. 3 illustrates an example of the right circular shifts of a 16-bit payload (e.g., for a payload having B=16 bis) and the decimal value for each shift. For example, the bit string having a shift of zero (e.g., the bit string 0101100100000101) may be the payload, and the payload might be encoded in a circularly shifted version of the payload having the lowest decimal value, e.g. the bit string 0000101010110010 having a shift of nine, of all possible shifts of the payload. Note that the bit string 0000010101011001 is the standard form of the payload bit string 1011001000001010. For example, S=0000010101011001 and P=1011001000001010. Note further that the bit positions $b_{15}$ to $b_0$ respectively denote the most to the least significant bit positions in FIG. 3, where bit position $b_{15}$ is the most significant bit position and bit position $b_0$ is the least significant bit position.

The shifted version of the payload, e.g., the standard form S=0011 from FIG. 2 or the standard form S=0000010101011001 from FIG. 3, might be repeated in a two-dimensional array of bits, and the bits in each successive row of the two-dimensional array of bits might be right circularly shifted from the bits in an immediately preceding row by a right circular shift that is an integer multiple of the right circular shift (e.g., a right circular shift of two bit positions for the example of FIG. 2 or a right circular shift of nine bit positions for the example of FIG. 3) that produced the shifted version of the payload.

Figure 4:
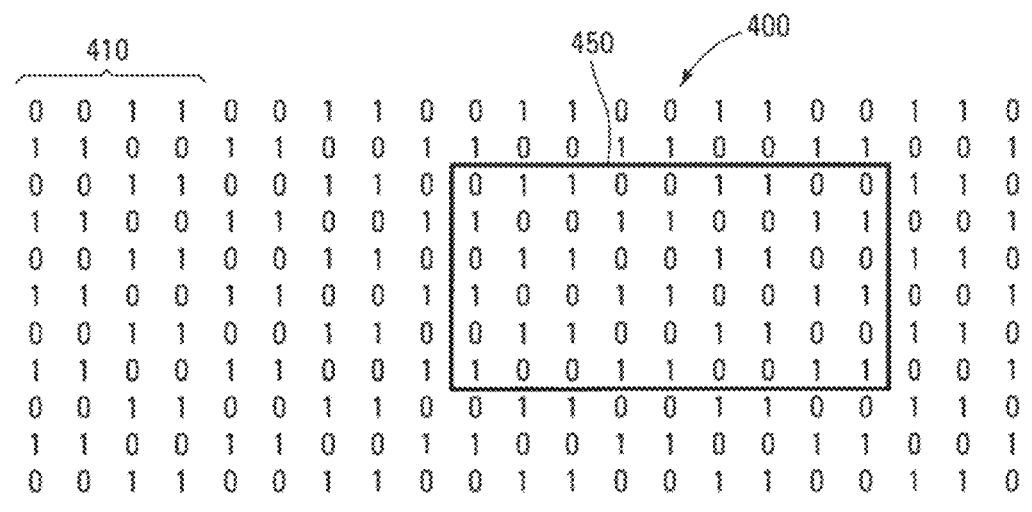

In the two-dimensional array 400 of data bits in the example of FIG. 4, the string 410 (e.g., a certain number of the bits of array 400), such as a unit string, of bits 0011 is repeated throughout array 400. Note that string 410 is a right-shifted version of the payload 1100, and is obtained by right shifting the bits of payload 1100 by two bit positions to the right, as discussed above in conjunction with FIG. 2. For example, string 410 is the standard form S=0011 of the payload P=1100. Note that the standard form may have all of bits of the payload, but in different order.

Each row of bits in two-dimensional array 400 are right circularly shifted from the bits in an immediately preceding row by a right circular shift that may an integer multiple of the right circular shift by which the bits in string 410 are shifted from the payload bits. For example, each row of bits in two-dimensional array 400 may be right circularly shifted from the bits in an immediately preceding row by a number of bit positions that may an integer multiple of the number of bit positions by which the bits in the standard form S of the payload P are right circularly shifted from bits in the payload P.

For example, the row-to-row right circular shift (e.g., the number of bits each row of bits may be right circularly shifted from the bits in an immediately preceding row) is D=kC, where D is the row-to-row right circular shift in bit positions in a two-dimensional array of bits (e.g., array 400), C is the number of bit positions by which the bits in the repeating string (e.g., the string 410 in the standard form of the payload) in the two-dimensional array are right circularly shifted from the bits in the payload, and k is an integer.

Note that C can be the number of bit positions from which the bits in the standard form of the payload are shifted from the bits in the payload.

In an example, the integer k might be one, and since the bits in string 410 are shifted from the payload bits by C=2 bit positions, the bits in each row of bits in array 400 may be right circularly shifted from the bits in an immediately preceding row by D=2 bit positions. Note, for example, that C also gives the number of bit positions by which the bits in the standard form the payload might be right circularly shifted to obtain the payload.

Each bit in array 400 may be represented by (e.g., encoded in) a data-bearing element in a data-bearing medium. In an example, the two-dimensional array 400 might be converted to a two-dimensional array of data-bearing elements (e.g., symbols) to form a data-bearing medium. For example, the bits 0011 in string 410 would respectively be encoded in the symbols in a unit string of symbols that would repeat (e.g., periodically) in the data-bearing medium, e.g., with the same repeat rate, i.e., the number of circular shifts per line of symbols, as string 410. Note, for example, that a bit might be encoded (e.g., represented) in the shift in a halftone cluster, in an optical element, a magnetic element, and optical element, etc.

In an example, a data-bearing medium might include a two-dimensional array of data-bearing elements having a plurality of repetitions of a subset of the data-bearing elements (e.g., a unit string of the data-bearing elements), where the positions of data-bearing elements in each row of the two-dimensional array of symbols are right circularly shifted from positions of the data-bearing elements in an immediately preceding row. For example, the number of positions by which the data-bearing elements in a row are circularly shifted from an immediately preceding row might be equal to an integer multiple of the number of bit positions by which the data bits encoded by the data-bearing elements of the repeating subset are circularly shifted from the bits the payload of the data-bearing medium. The repeating subsets might be contiguous and/or might repeat periodically, e.g., with a period equal to the number of bits in the subset. The subset of data-bearing elements might contain one or more data-bearing elements, for example.

Figure 5:
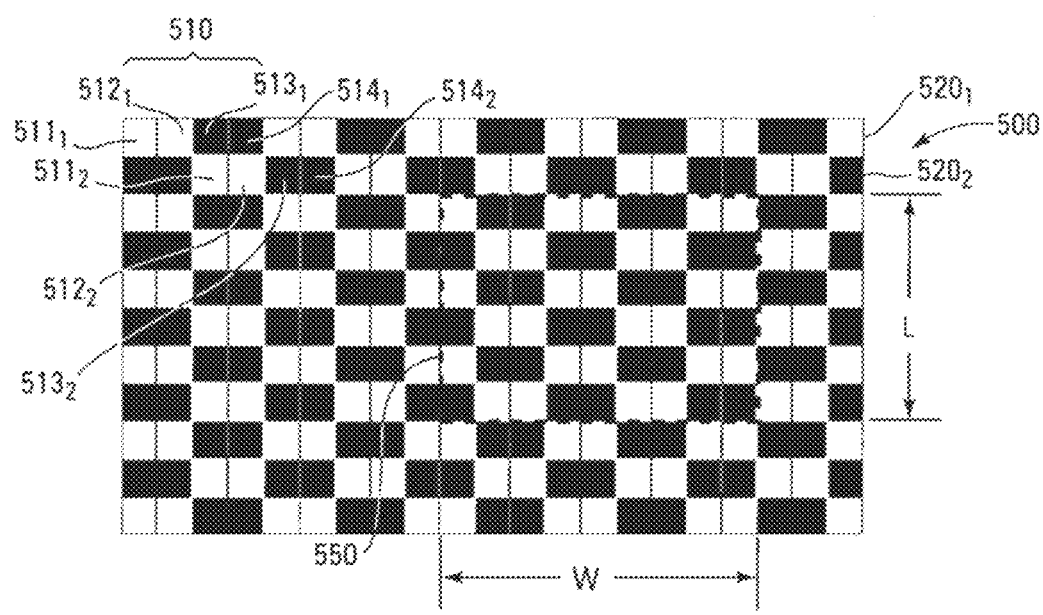
FIG. 5 is an example of a data-bearing medium.

FIG. 5 is an example of a data-bearing medium 500, such as two-dimensional barcode, that encodes the data bits in array 400 in a two-dimensional array of data-bearing elements, such as symbols, e.g., in a two-dimensional array of two-toned modules, such as black and white modules. For example, the zeros might be encoded in white (W) modules and the ones might be encoded in black (K) modules or vice versa. As such, the shifted payload bits 0011 of string 410 may be respectively encoded as WWKK, e.g. corresponding to a unit string 510 of symbols. For example, the bits 0011 may be respectively encoded in a white module 511, a white module 512, a black module 513, and a black module 514 of the unit string 510. For other examples, the black and white modules might represent relatively low and high reflective areas in an optical media, areas of different magnetism in a magnetic medium, or an atom containing area and a void area of an atomic medium.

In an example, data-bearing medium 500 might include a plurality of periodic, contiguous repetitions of the unit string 510, where unit string 510 includes a subset of the black and white modules of data-bearing medium 500. The positions of the black and white modules in each row of data-bearing medium 500 may be right circularly shifted from the black and white modules in an immediately preceding row. For example, the positions of white module $511_2$, white module $512_2$, black module $513_2$, and black module $514_2$ in row $520_2$ might be right circularly shifted by two bit positions from the positions of white module $511_1$, white module $512_1$, black module $513_1$, and black module $514_1$ in row $520_1$.

Figure 6:
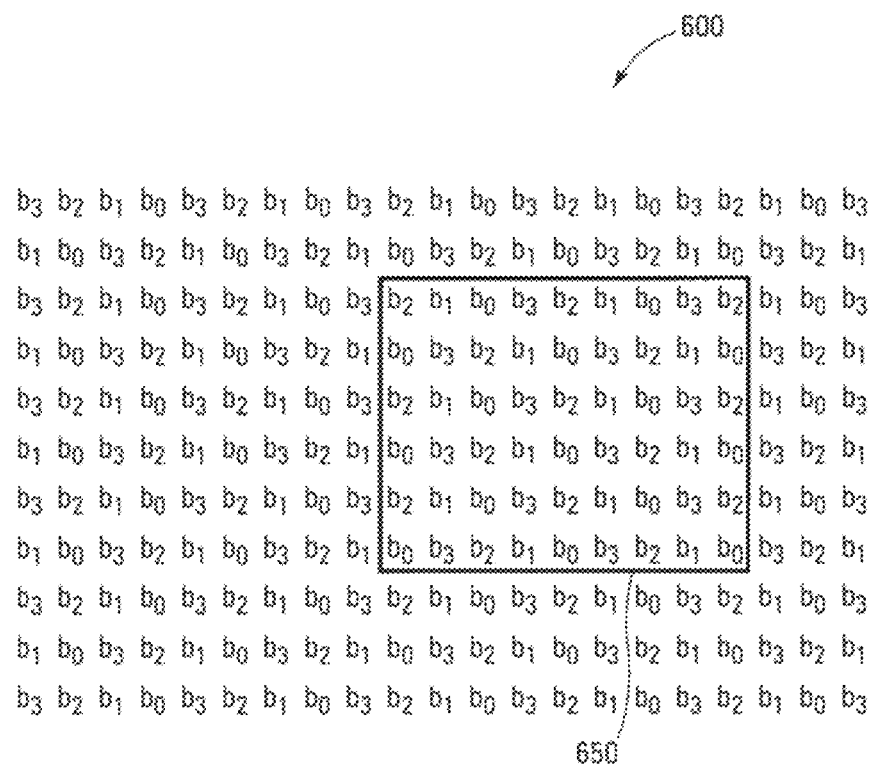

FIG. 6 corresponds to FIGS. 4 and 5 and illustrates an array 600 of the positions of the bits in array 400 and the positions of the bits in string 410 in FIG. 4. For example, the bit positions $b_3$, $b_2$, $b_1$, and $b_0$ are respectively the bit positions of the bits 0011 of string 410. Note that the bit positions $b_3$ to $b_0$ respectively denote the most to the least significant bit positions in FIG. 6, where bit position $b_3$ is the most significant bit position in FIG. 6 and bit position $b_0$ is the least significant bit position in FIG. 6. FIG. 6 shows, for example, that the positions of the bits in each row of bits are right circularly shifted from the bits in an immediately preceding row by a circular shift that is an integer multiple of the circular shift (e.g., two bit positions) by which the bits 0011 of string 410 are shifted from the payload bits 1100, e.g., as discussed above in conjunction with FIG. 2.

Moreover, the bit positions $b_3$, $b_2$, $b_1$, and $b_0$ in FIG. 6 respectively correspond to a white module 511, a white module 512, a black module 513, and a black module 514 in FIG. 5. This means, for example, that the black and white modules in each row of data-bearing medium 500 are right circularly shifted from the black and white modules in an immediately preceding row by a number of modules equal to the number of bit positions by which the bits 0011 of string 410 are shifted from the payload bits 1100. For example, the row-to-row right circular shift in the black and white modules in data-bearing medium 500 might be equal to D=kC, where k=1 and C is the number of bit positions by which the bits 0011 of string 410 are shifted from the payload bits 1100.

Figure 7:
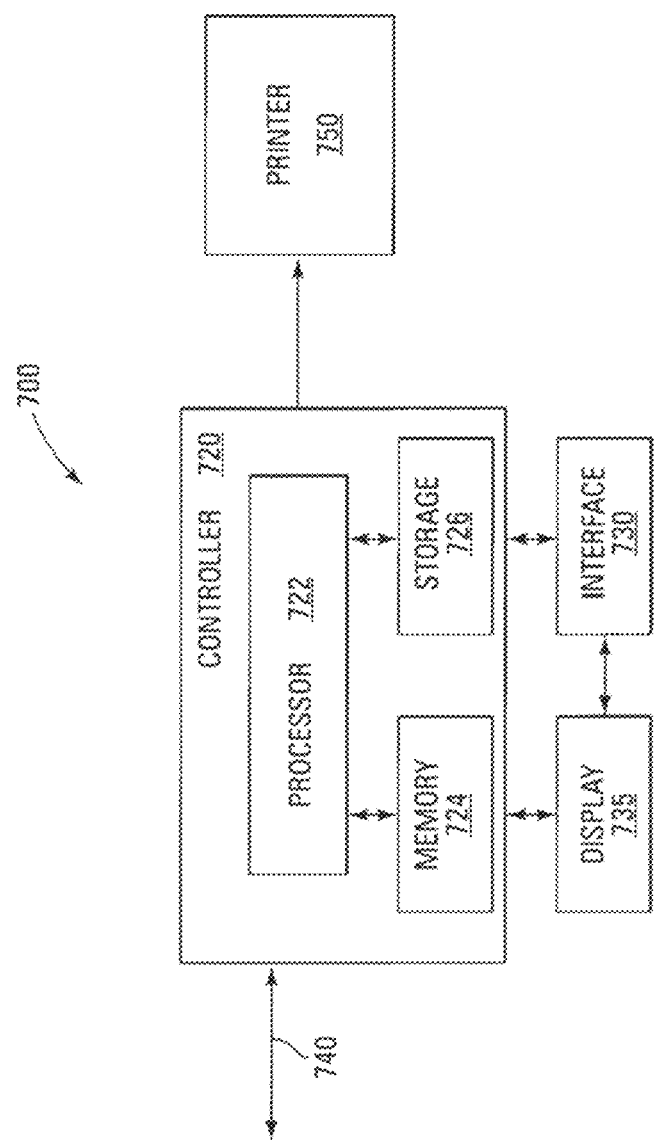
FIG. 7 is a block diagram of an example of a data-bearing-medium-generation system.

FIG. 7 is a block diagram of an example of a data-bearing-medium-generation system 700 that may be configured to generate data-bearing media, such as data-bearing media 100 and 500. For example, data-bearing-medium-generation system 700 may be configured to generate the data-bearing media disclosed herein, such as data-bearing halftones (e.g., stegatones), graphical alpha-numerics, barcodes, data-bearing magnetic, atomic, and optical media, etc. System 700 may include a controller 720 that may be configured to allow system 700 to perform the methods and functions disclosed herein for generating (e.g., automatically) the data-bearing media disclosed herein. Note that when one or more operations are performed by a device, such as system 700, in response to an event without user intervention, the one or more operations may be taken as being performed automatically, for example.

Controller 720 may include a processor 722 for processing machine-readable instructions, such as processor-readable (e.g., computer-readable) instructions. The machine-readable instructions may configure processor 722 to allow controller 720 to allow system 700 to perform the methods and functions associated with generating (e.g., automatically) the data-bearing media disclosed herein.

The machine-readable instructions may be stored in a memory 724, such as a non-transitory computer-usable medium, coupled to processor 722 and may be in the form of software, firmware, hardware, or a combination thereof. In a hardware solution, the machine-readable instructions may be hard coded as part of processor 722, e.g., an application-specific integrated circuit (ASIC) chip. In a software or firmware solution, the instructions may be stored for retrieval by the processor 722. Some additional examples of non-transitory computer-usable media may include static or dynamic random access memory (SRAM or DRAM), read-only memory (ROM), electrically erasable programmable ROM (EEPROM) memory, such as flash memory, magnetic media and optical media, whether permanent or removable, etc. Some consumer-oriented computer applications are software solutions provided to the user in the form of downloads, e.g., from the Internet, or removable computer-usable non-transitory media, such as a compact disc read-only memory (CD-ROM) or digital video disc (DVD).

Controller 720 may include a storage device 726, such as a hard drive, removable flash memory, etc. Storage device 726 may be configured to store digital image data (e.g., bitmaps, PDFs, TIFFs, JPEGs, etc.) corresponding to (e.g., representing) the data-bearing media disclosed herein. Storage device 726 may be configured to store encryption keys, such as PKI and IBE encryption keys configured to encrypt data to be encoded into the data-bearing media.

A human-machine interface 730 may be coupled to controller 720. Interface 730 may be configured to interface with a number of input devices, such as a keyboard and/or pointing device, including, for example, a mouse, interface 730 may be configured to interface with a display 735 that may include a touchscreen that may function as an input device. Controller 720 may be coupled to a data network, such as the Internet, a Local Area Network (LAN), etc., and/or a computer via an interface 740. System 700 may include a printer 750 coupled to controller 720. Printer 750 may be used to print digital image data, corresponding to data-bearing media, as hard-copy images. The printer might be replaced with apparatus for creating data-bearing elements on atomic data-bearing media, magnetic data-bearing media, optical data-bearing media, etc., for example.

Processor 722, memory 724, and storage 720 might be part of a computer, such as a personal computer, for example. As such, the machine-readable instructions may configure processor 722 to allow a computer to create electronic versions of data-bearing media. For example, the computer may be coupled to a printer, such as printer 750, that can print the electronic versions of data-bearing media as hardcopy images.

It should be recognized that the functionality of the various block components described with reference to FIG. 7 may not necessarily be segregated into distinct components or component portions of a data-bearing-media-generation system. For example, a single component or component portion of a data-bearing-media-generation system could be adapted to perform the functionality of more than one block component of FIG. 7. Alternatively, one or more components or component portions of a data-bearing-media-generation system could be combined to perform the functionality of a single block component of FIG. 7.

Figure 8:
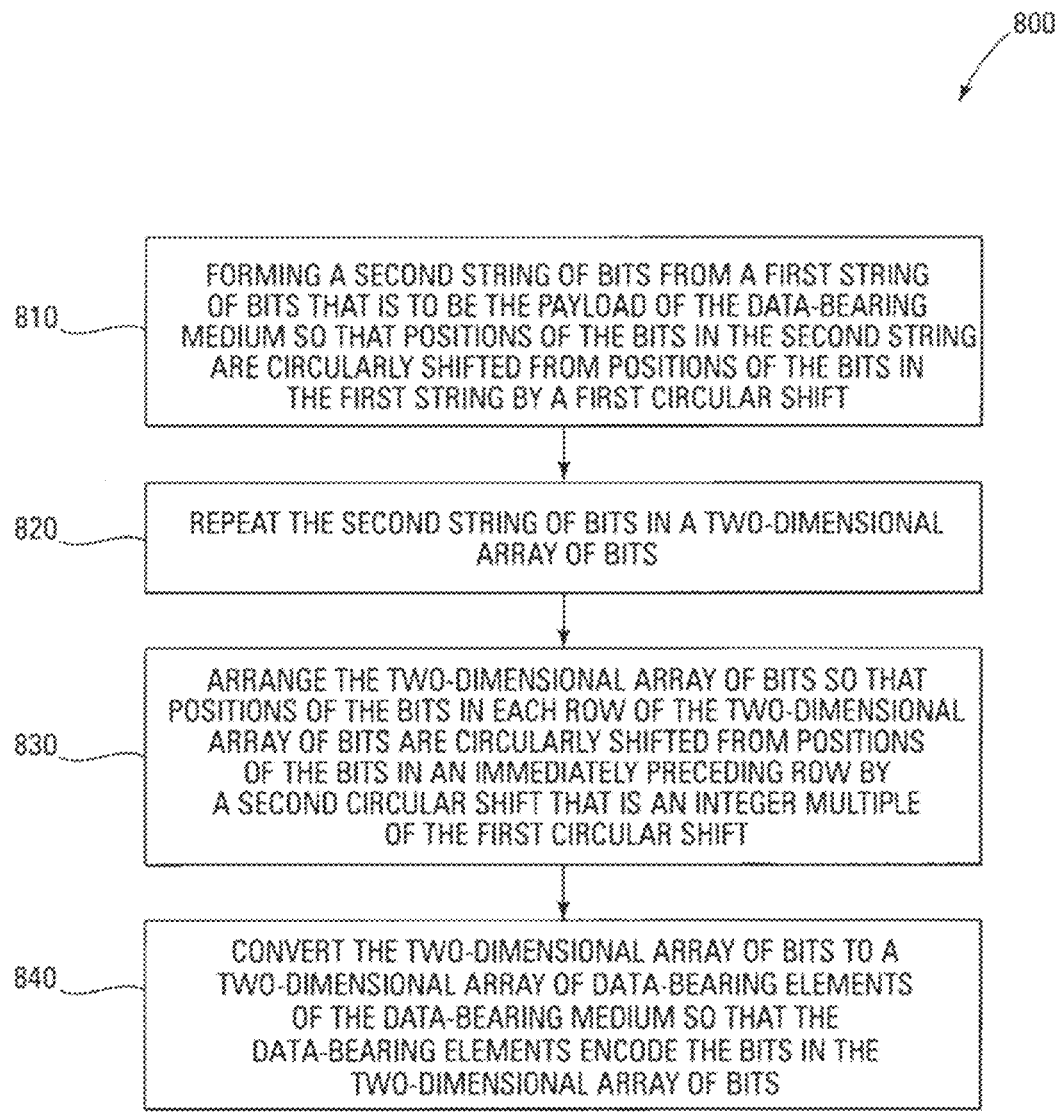
FIG. 8 is a flowchart of an example of a method for automatically forming a data-bearing medium.

The machine-readable instructions may configure processor 722, to allow controller 720 to allow data-bearing-media-generation system 700 to perform a method 800 of automatically forming a data-bearing medium, such as data-bearing medium 500 in FIG. 5, as illustrated by the flowchart in FIG. 8. Data-bearing-medium-generation system 700 may perform method 800 in response to receiving an instruction, e.g., from a user, that a data-bearing medium is to be formed.

At block 810, controller 720 might form a second string of bits, e.g., string 410 in FIG. 4, from a first string of bits that is to be the payload of the data-bearing medium so that positions of the bits in the second string are circularly shifted (e.g., right circularly shifted) from positions of the bits in the first string by a first circular shift. For example, controller 720 might receive the first string of bits as an input and form the second string of bits in response to the input.

The first string of bits might be an encrypted version of the payload that is encrypted by controller 720. For example, controller 720 might receive the payload and encrypt the payload into the first string of bits before forming the second string of bits.

Controller 720 might repeat the second string of bits in a two-dimensional array of bits, such as array 400 (FIG. 4), at block 820. At block 830, controller 720 might arrange the two-dimensional array of bits so that the bits in each successive row of the two-dimensional array of bits are circularly shifted (e.g., right circularly shifted) from the bits in an immediately preceding row by a second circular shift that is an integer multiple of the first circular shift.

At block 840, controller 720 might convert the two-dimensional array of bits to a two-dimensional array of data-bearing elements of the data-bearing medium so that the data-bearing elements encode the bits in the two-dimensional array of bits. For example, each data-bearing element might encode one of the bits in the two-dimensional array of bits. In an example of including data-bearing halftone images, no more than half of the data-bearing elements might encode the bits in the two-dimensional array of bits. For example, the data-bearing elements might include halftone clusters that are shifted in a certain way to encode their respective bits.

In an example, a string of data-bearing elements that encodes the second string of bits might repeat within the two-dimensional array of symbols. Positions of the data-bearing elements in each row of the two-dimensional array of data-bearing elements might be circularly shifted (e.g., right circularly shifted) from positions of the data-bearing elements in an immediately preceding row by the second circular shift, for example. Controller 840 might cause printer 750 to print the data-bearing medium as a hardcopy image, for example.

Figure 9:
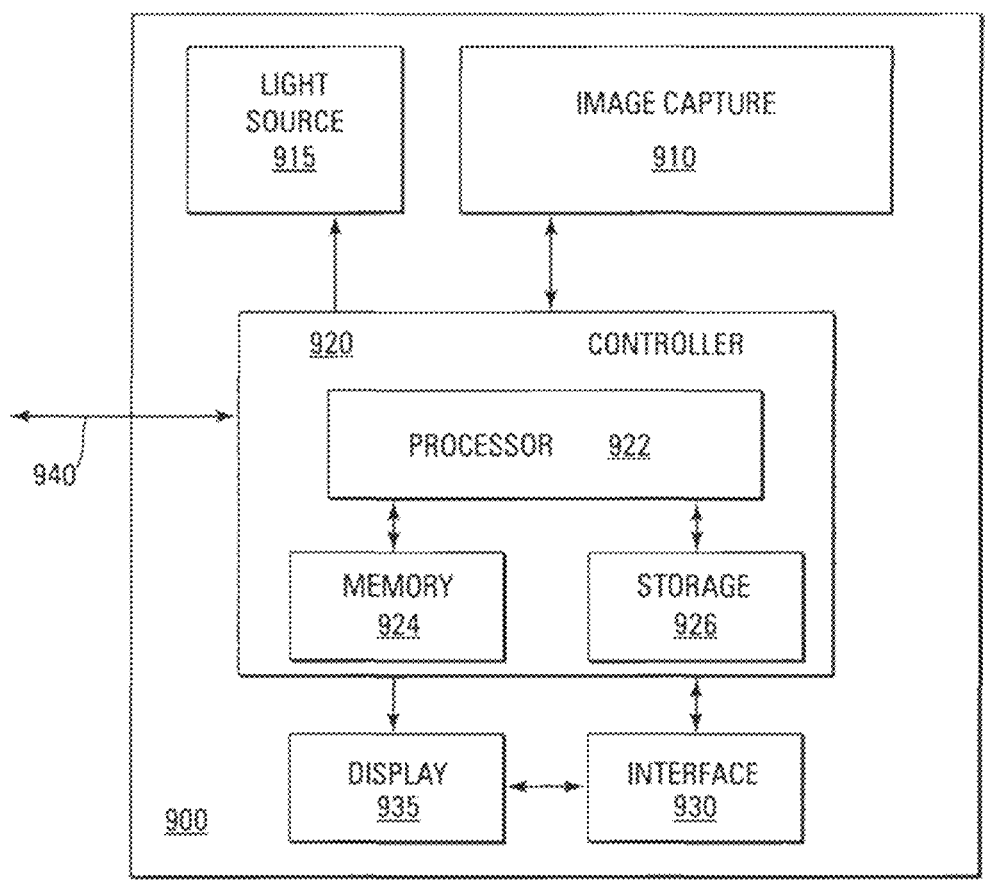
FIG. 9 is a block diagram of an example of a data-recovery system.

FIG. 9 is a block diagram of an example of a data-recovery system 900 (e.g., a data-bearing-medium reader) configured to recover data, e.g., a payload, from a data-bearing medium, such as data-bearing media 100 and 500. For example, data-recovery system 900 configured to recover data from the examples of the data-bearing media disclosed herein, such as data-bearing halftones (e.g., steganographic halftones, such as stegatones), graphical alphanumerics, barcodes, etc. System 900 may be a mobile (e.g., handheld) device that may be moved relative to a stationary data-bearing medium or a stationary or fixed-position device that remains stationary or fixed while a data-bearing medium is moved past it.

System 900 might be configured to capture a portion of a data-bearing medium, such as region (e.g., cropped region) 110 that is a portion (e.g., a crop) of data-bearing medium 100 in FIG. 1 or region (e.g., cropped region) 550 that is a portion (e.g., a crop) of data-bearing medium 500 in FIG. 5.

The number of data-bearing elements in a cropped region of a data-bearing medium (e.g., region 110 or region 550) is L×W, where L is the number of data-bearing elements in the crop in the column (e.g., vertical) direction of the crop and W is the number of data-bearing elements in the crop in the row (e.g., horizontal) direction of the crop. For example, for region 550, L is the number of modules (e.g., 6) in each column, and W is the number of modules (e.g., 9) in each row. Note, for example, that where each data-bearing element encodes one bit, the number of symbols might be equal to the number of bits. For example, each module in region 550 encodes one of the bits b in region 650 in FIG. 6 and one of the ones or zeros in region 450 in FIG. 4, meaning that regions 450 and 650 have 6×9=54 bits.

Each of the data-bearing elements in some halftone data-bearing images, for example, might not encode a bit. For example, no more than a fraction (e.g., ½) of the data-bearing elements in some halftone data-bearing media might encode a bit. Therefore, a crop of a halftone image might contain NLW bits where N is the fraction of data-bearing elements encoding a bit. Note that N=1 for region 550.

In an example, the number of bits NLW might be no less than (e.g., greater than or equal to) BR, where B is the number of bits in the repeating payload (e.g., four in the examples of FIGS. 4-6) and R is the average number of repetitions of each bit of the repeating payload in the cropped region. For example, NLW≥BR.

Although FIG. 5 shows the unit string 510 that encodes the circularly shifted payload as having fewer data-bearing elements that the number of data-bearing elements W that correspond to the width of region 550, in other examples, the number of data-bearing elements in unit string 510 can be greater than or equal to W. Therefore, the number of bits in the payload (e.g., B) can be greater than or equal to the number of bits in a row of a cropped region, for example.

System 900 may include a data-bearing-media capturing device, e.g., an image-capturing device 910, such as a camera (e.g., a CID camera), configured to capture a data-bearing medium, e.g., an image of a data-bearing medium. Image-capturing device 910 may be configured to convert the captured image into digital image data (e.g., a bitmap, PDF, TIFF, JPEG, etc.), for example. In an example, a capture area of the data-bearing-media capturing device might be the size of region 110 in FIG. 1 or region 550 in FIG. 5. Note, for example, that the capturing device might be configured to capture (e.g., detect) data-bearing elements on atomic data-bearing media, magnetic data-bearing media, optical data-bearing media, etc.

In an example, system 900 may include an illumination source, such as a light source 915, configured to illuminate a data-bearing medium prior to reading the data-bearing medium. For example, light source 915 might illuminate a portion of a data-bearing medium, such as region 110 or region 550.

System 900 may include a controller 920 (e.g., a decoder) that may be configured to allow system 900 to perform the methods and functions disclosed herein for recovering data, such as a payload, from a data-bearing medium, e.g., from a portion of the data bearing image. The functionality of image-capturing device 910 that converts the captured image of a data-bearing medium into digital image data, representing the data-bearing medium may be incorporated in controller 920.

Controller 920 may include a processor 922 for processing machine-readable instructions, such as processor-readable (e.g., computer-readable) instructions. The machine-readable instructions may configure processor 922 to allow controller 920 to allow system 900 to perform the methods and functions disclosed herein associated with recovering a payload from a data-bearing medium, e.g., from a portion a data-bearing medium. For example, the machine-readable instructions may configure controller 920 to allow system 900 to perform the methods and functions associated with recovering the payload of a data-bearing medium, e.g., from a captured region of the data-bearing medium that might be a portion of the data-bearing medium without reading the entire data-bearing medium.

The machine-readable instructions may be stored in a memory 924 coupled to processor 922, such as a non-transitory computer-usable medium, and may be in the form of software, firmware, hardware, or a combination thereof.

In a hardware solution, the machine-readable instructions may be hard coded as part of processor 922, e.g., an application-specific integrated circuit (ASIC) chip. In a software or firmware solution, the instructions may be stored for retrieval by the processor 922.

Controller 920 may include storage device 926, such as a hard drive, removable flash memory, etc. Storage device 926 may be configured to store decryption keys, such as PKI (Public Key Infrastructure) and IBE (Identity Based Encryption) decryption keys, configured to respectively decrypt data decoded from a data-bearing medium. For example, controller 920 might be configured to decrypt a recovered payload that might be encrypted.

A human-machine interface 930 may be coupled to controller 920. Interface 930 may be configured to interface with a number of input devices, such as a keyboard and/or pointing device, including, for example, a mouse, interface 930 may be configured to interface with a display 935 that may include a touchscreen that may function as an input device. Controller 920 may be coupled to a data network, such as the Internet, a Local Area Network (LAN), etc., and/or a computer via an interface 940.

It should be recognized that the functionality of the various block components described with reference to FIG. 9 may not necessarily be segregated to distinct components or component portions of a data-recovery system. For example, a single component or component portion of a data-recovery system could be adapted to perform the functionality of more than one block component of FIG. 9. Alternatively, one or more components or component portions of a data-recovery system could be combined to perform the functionality of a single block component of FIG. 9.

Processor 922, memory 924, storage device 926, and/or human-machine interface 930 may be implemented in a computer, for example, and the capturing device (e.g., image-capturing device 910) might be removably coupleable to the computer, for example.

Figure 10:
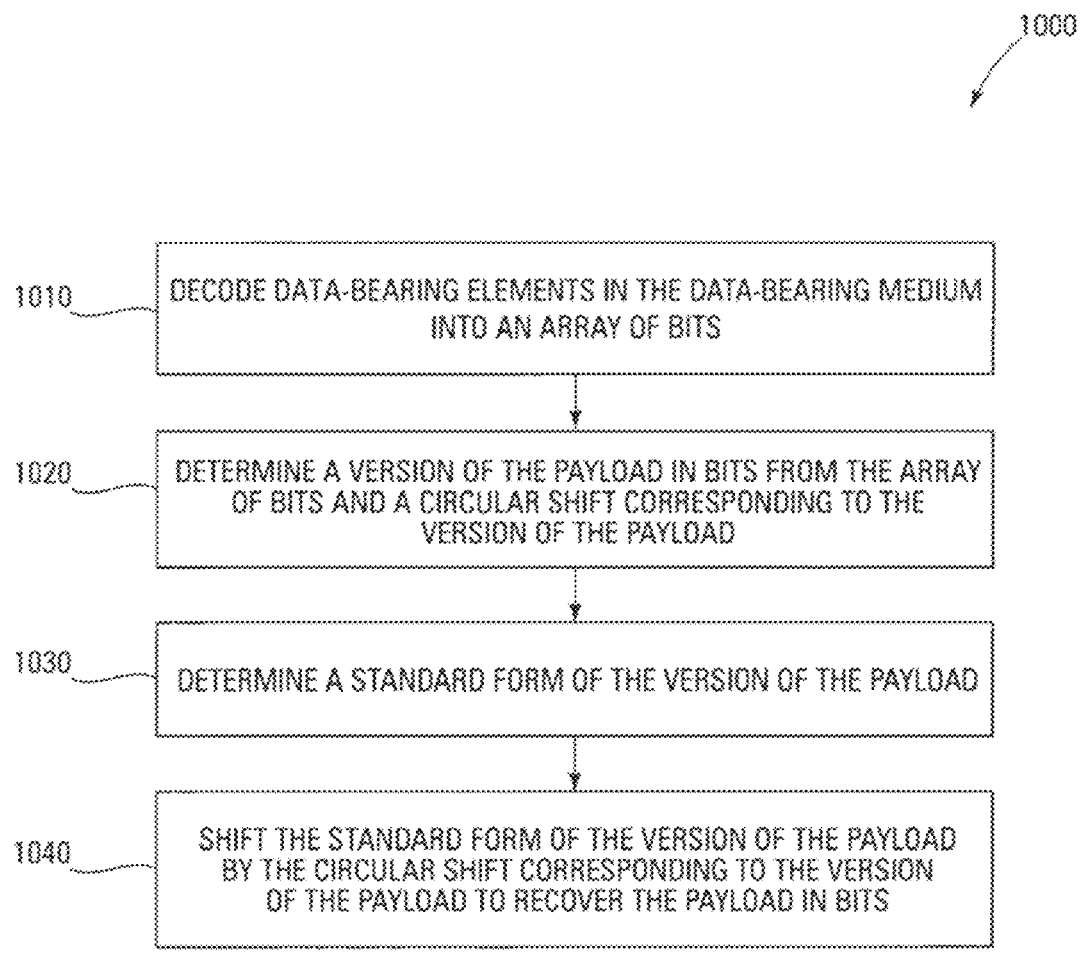
FIG. 10 is a flowchart of an example of a method for automatically recovering data from a data-bearing medium.

The machine-readable instructions may configure processor 922 to allow controller 920 to allow data-recovery system 900 to perform a method 1000 of automatically recovering a payload from a data-bearing medium, such as data-bearing medium 500 in FIG. 5, as illustrated by the flowchart in FIG. 10, for example. Data-recovery system 900 may perform method 1000 in response to capturing (e.g., an image of) at least region 550 of data-bearing medium 500.

Note that B, the number of bits in the payload, might be input to system 900 by a user or might be preprogrammed in system 900 and stored in storage 926. Note that the integer multiple k in the expression D=kC might be input to system 900 by a user or might be preprogrammed in system 900 and stored in storage 926. Controller 920 might know a priori that an image is a data-bearing medium having a circular code. This information might be input to system 900 by a user. Alternatively, system 900 might be dedicated to handling data-bearing media having circular code, for example. In addition, controller 920 might need to know what side of the image is the top. For example, the image might need to be oriented in a certain way relative to system 900. For example, system 900 might instruct the user how to orient the image or system 900, e.g., via display 935, a label fixed to system 900, etc.

Controller 920 may decode data-bearing elements in the data-bearing medium into an array of bits, corresponding to the portion of the data-bearing medium, at block 1010. For example, controller 920 might decode the data-bearing elements in a portion, e.g., region 550, of the data-bearing image. Controller 920 might assign a zero, one, or abstain to a data-bearing element. For example, controller might assign the bits in region (e.g. sub-array) 450 of array 400 in FIG. 4 to the symbols in region 550 in FIG. 5. In an example, controller 920 might be configured to assign an abstain label to any data-bearing element that is degraded due to damage, noise, or otherwise uncodable. Controller 920 might be configured to exclude abstains from the recovery process, for example.

By way of example, to better understand an abstention, consider the example where a correct candidate shift is being tested and 13 samples of payload symbol representing a bit value of one are recovered in the presence of noise. In this example seven symbols might be determined by the recovery system to be relatively noise-free and are assigned the value one. The remaining six symbols might be degraded by noise resulting in recovery values zero for 4 of the symbols and one for 2 of the symbols. The average recovery value for this bit without using abstentions would be 9/13=0.69. However, if the recovery system assigned abstentions to the 6 noisy symbols and excluded them the resulting average would be 7/7=1.00.

For example, the array of bits might be the array (e.g., sub-array) 450 that is a portion of array 400 in FIG. 4. The symbols in region 550 in FIG. 5 might encode the bits in array 450 in FIG. 4, for example.

Controller 920 may determine a version (e.g., a potential version) P* of the payload in bits from the array of bits and a circular shift (e.g., a right circular shift) corresponding to the version of the payload at block 1020. Controller 920 may determine a standard form of the version of the payload at block 1030. Controller 920 may shift the version of the payload in standard form by the circular shift corresponding shift between the standard form of the payload and the original form of the payload to recover the payload in bits at block 1040.

Following is an example of how controller 920 might determine the version P* of the payload in bits from the array of bits and the circular shift corresponding to the version P* of the payload (e.g., see block 1020 in FIG. 10). For example, the version P* of the payload might be a shifted version of the payload P and might be determined from a plurality of candidate versions $P_i^*$ of P*, where i=0, k, 2k, . . . , (B=1)k, where k is the integer from the relationship D=kC defined above, and B is the number of bits (e.g. bit positions) in the payload. Note that each candidate version $P_i^*$ might be a shifted version of the payload P, for example.

Note, for example, that, each candidate version $P_i^*$ may be determined (e.g., estimated) from a candidate row-to-row circular shift (e.g., offset) $d_i$. For example, a candidate version $P_i'$ is obtained for each of all of the possible row-to-row circular shifts of the bits in the array (e.g., the array in region 450) decoded from the cropped region (e.g., region 550).

FIGS. 11A-11D illustrate an example of the determination of a version P* of a payload P from a plurality of candidate versions $P_i'$ for the region 550 of data-bearing medium 500 in FIG. 5 and the corresponding array of bits in region 450 in FIG. 4 obtained from decoding region 550 and region 650 in FIG. 6 that gives the bit positions b of the bits in region 450. Note that FIGS. 11A, 11B, 11C, and 11D respectively correspond to the row-to-row candidate shifts of 0, 1, 2, and 3 and thus to the candidate row-to-row offsets of $d_0$, $d_1$, $d_2$, and $d_3$, where k=1 and B=4 for the example of FIGS. 4-6.

The candidate row-to-row offset d corresponding to the version P* of the payload determined from the candidate versions $P_1'$ gives D, the row-to-row right circular shift in the cropped region, e.g., regions 450, 550, and 650, and thus in the overall data-bearing medium (e.g., data bearing image 500) and overall data arrays corresponding to the overall data-bearing medium (e.g., arrays 400 and 600). This information allows the determination of C (e.g., from D=kC), the number of bit positions by which the bits in the standard form S of the payload P are right circularly shifted from the payload P and thus the number of bits positions by which the bits in S need to be right circularly shifted to obtain P.

Figures 11A, 11B:
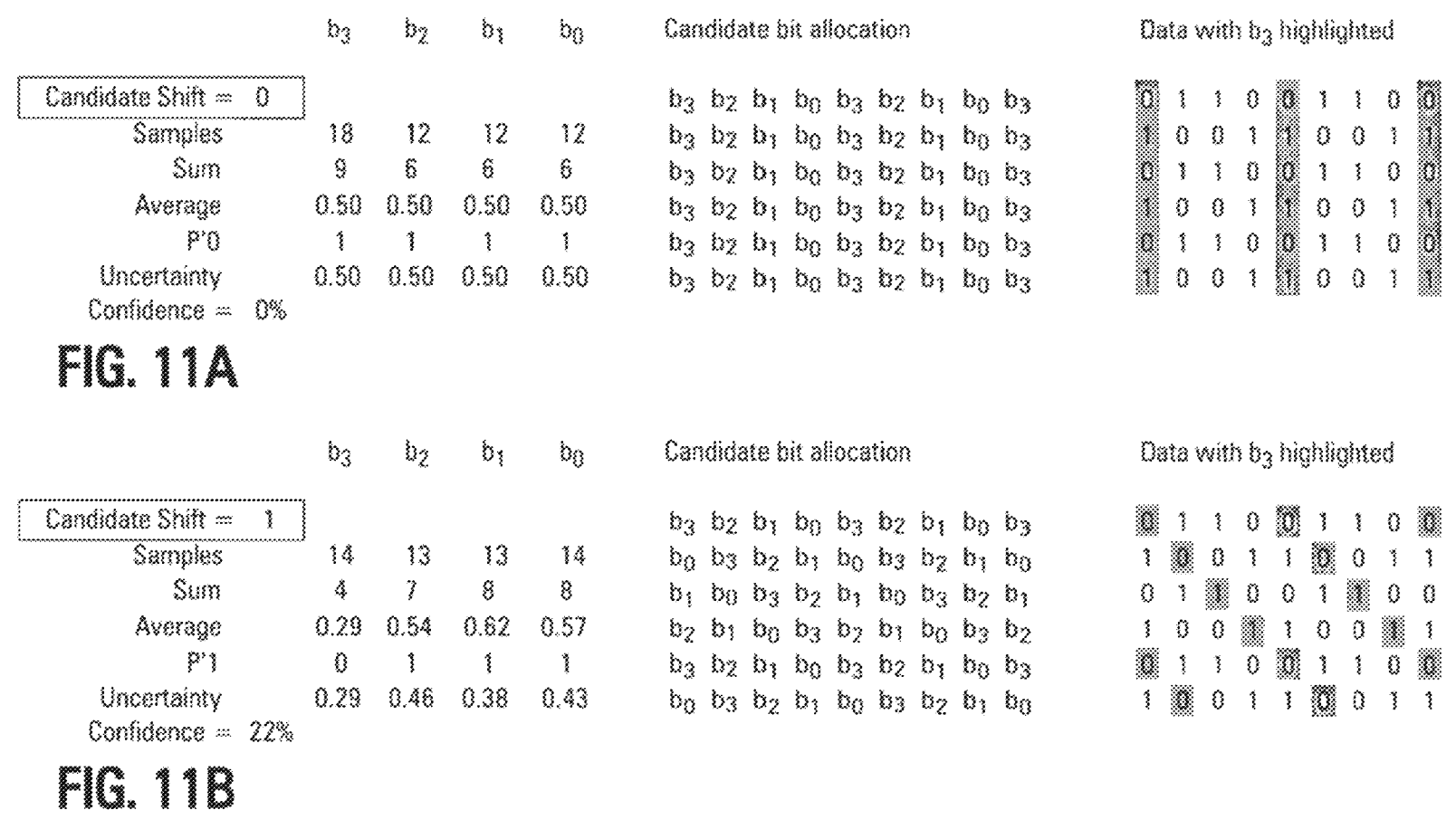

FIG. 11A corresponds to a row-to-row offset of $d_0$=0 (e.g., a candidate shift of zero), meaning that the candidate bit allocation is the same as in region 650 of FIG. 6 and the data is the same as in region 450 of FIG. 4. The $b_3$ data (e.g., the shaded ones and zeros) in FIG. 11A are summed follows: 0+1+0+1+0+1+0+1+0+1+0+1+0+1+0+1+0+1=9. The $b_2$ data in FIG. 11A are summed as follows 1+0+1+0+1+0+1+0+1+0+1+0=6, as are the $b_1$ and $b_0$ data. The average of sum for each $\{b_{B-1}, \ldots, b_1, b_0\}$ is then determined by dividing the respective sum by the number of samples in the summation. For example, the sum for bit position $b_3$ is divided by 18 samples. FIG. 11A gives the sum for each of the bit positions b and the average of the sum for each bit position for the row-to-row offset of zero.

FIG. 11B corresponds to a row-to-row offset of $d_1$=1 (e.g., a candidate shift of one), meaning that each row in FIG. 11B is right circularly shifted from an immediately preceding row by one bit position. The $b_3$ data (e.g., the shaded ones and zeros) in FIG. 11B are summed as follows 0+0+0+0+1+1+0+0+0+0+1+1+0+0=4. The $b_2$ data in FIG. 11B are summed as follows 1+1+1+0+0+0+1+1+1+0+0+0+1=7, as are the $b_1$ and $b_0$ data. The average of the sum for each $\{b_{B-1}, \ldots, b_1, b_0\}$ is then determined by dividing the respective sum by the number of samples in the summation. For example, the sum for bit position $b_3$ is divided by 14 samples. FIG. 11B gives the sum for each of the bit positions b and the average of the sum for each bit position for the row-to-row offset of one.

Figures 11C, 11D:
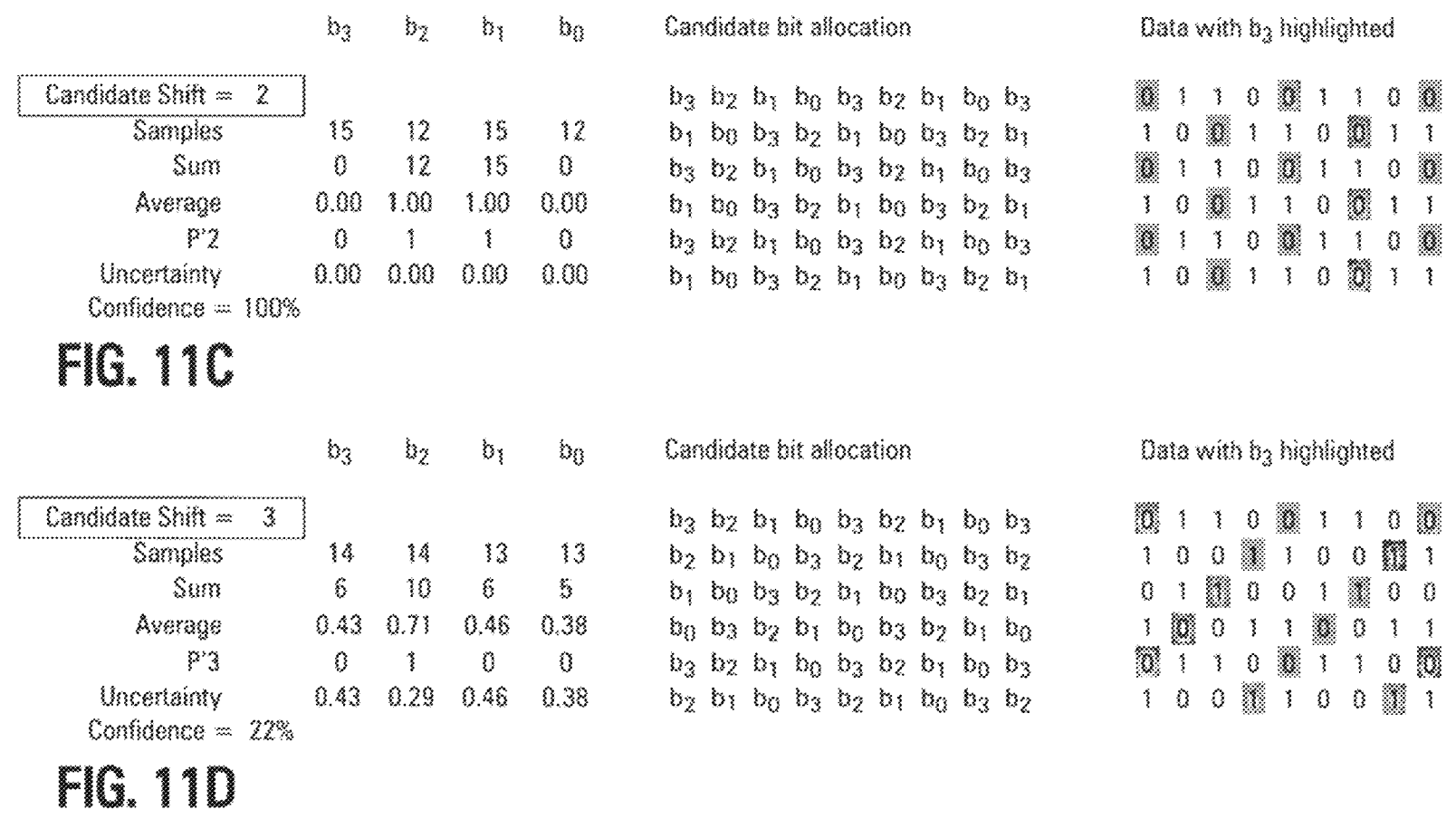

FIG. 11C corresponds to a row-to-row offset of $d_2$=2 (e.g., a candidate shift of two), meaning that each row in FIG. 11C is right circularly shifted from an immediately preceding row by two bit positions. The $b_3$ data (e.g., the shaded ones and zeros) in FIG. 11C are summed as follows 0+0+0+0+0+0+0+0+0+0+0+0+0+0+0=0. The $b_2$ data in FIG. 11C are summed as follows 1+1+1+1+1+1+1+1+1+1+1+1=12, as are the $b_1$ and $b_0$ data. The average of sum for each $\{b_{B-1}, \ldots, b_1, b_0\}$ is then determined by dividing the respective sum by the number of samples in the summation. For example, the sum for bit position $b_3$ is divided by 15 samples. FIG. 11C gives the sum for each of the bit positions b and the average of the sum for each bit position for the row-to-row offset of two.

FIG. 11D corresponds to a row-to-row offset of $d_3$=3e (e.g., a candidate shift of three), meaning that each row in FIG. 11D is right circularly shifted from an immediately preceding row by three bit positions. The $b_3$ data (e.g., the shaded ones and zeros) in FIG. 11D are summed as follows 0+0+0+1+1+1+0+0+0+1+1+1+0+0=6. The $b_2$ data in FIG. 11D are summed as follows 1+1+1+1+0+0+1+1+1+0+0+1+1=10, as are the $b_1$ and $b_0$ data. The average of sum for each bit position $\{b_{B-1}, \ldots, b_1, b_0\}$ is then determined by dividing the respective sum by the number of samples in the summation. For example, the sum for bit position $b_3$ is divided by 14 samples. FIG. 11D gives the sum for each of the bit positions b and the average of the sum for each bit position for the row-to-row offset of three.

The bits in the bit positions $\{b_{B-1}, \ldots, b_1, b_0\}$ of the candidate version $P_1'$ for each candidate shift may be determined from the average values of the bit positions $\{b_{B-1}, \ldots, b_1, b_0\}$ by assigning a value of zero to an average value that is less than 0.5 and a value of one to an average value that is greater than or equal to 0.5. For example, this is shown for the candidate versions $P_0'$, $P_1'$, $P_2'$, and $P_3'$ respectively for the candidate shifts of 0, 1, 2, and 3 respectively in FIGS. 11A, 11B, 11C, and 11D.

In an example, the uncertainty $u_j$ in each bit position may be determined as the absolute value of the difference between the average value in the bit position and the bit value assigned to the bit position, as shown in FIGS. 11A-1D. A confidence level of the candidate version $P_1'$ for each candidate shift may be computed as $CL=1-(2/B)\Sigma u_j$, where the summation is from $j=0, 1, 2, \ldots, (B-1)$, for example. The uncertainty in each bit for each of candidate versions $P_0'$, $P_1'$, $P_2'$, and $P_3'$ are respectively given in FIGS. 11A, 11B, 11C, and 11D, as are the confidence levels multiplied by 100 to express them as percentages. For example for a candidate shift of 1, the certainty level for $P_2'$ and B=4, is $CL=1-(2/4)(0.29+0.46+0.38+0.43)=0.22$ or 22 percent.

In an example, the candidate version $P_1'$ having the highest confidence level is taken to be the version P* of the payload in bits and the candidate shift $d_1$ that gives the candidate version $P_1'$ having the highest confidence gives the row-to-row right circular shift D in the crop region and thus the overall data-bearing medium. For example, in the example of FIGS. 11A-11D, $P_2'=0110$ has the highest confidence level, and the candidate shift $d_2$ that gives $P_2'=0110$ is two. This means that $P^*=P_2'=0110$ and $D=d_2=2$. Therefore, the row-to-row right circular shift in the regions 450, 550, and 650 and thus in data-bearing medium 500 and the corresponding arrays 400 and 500 is D=2.

Controller 920 may then determine the standard form (e.g., the standard phase) S of the determined version P* of the payload. For example, controller might determine a plurality of versions of the version P* of the payload by right circularly shifting the bits in P* to different positions. For example, all of the possible circular shifts of P*=0110 and their decimal values are given in FIG. 12. The standard phase of P*=0110, e.g., corresponding to the lowest decimal value, is S=0011.

Controller 920 may then determine C, the number of bit positions by which the standard phase needs to be shifted, from D=kC. Note that for the present example k is one, meaning that C=D=2. Controller 920 may then right circularly shift the standard form S of the version P* of the payload by the right circular shift C corresponding to the version of the payload to recover the payload in bits. For example, controller 920 might right circularly shift S=0011 by two to recover the payload P=1100, as is apparent from FIG. 12.

For some embodiments, the foregoing examples might be modified for some data-bearing halftone images, such as stegatones.

Figure 13:
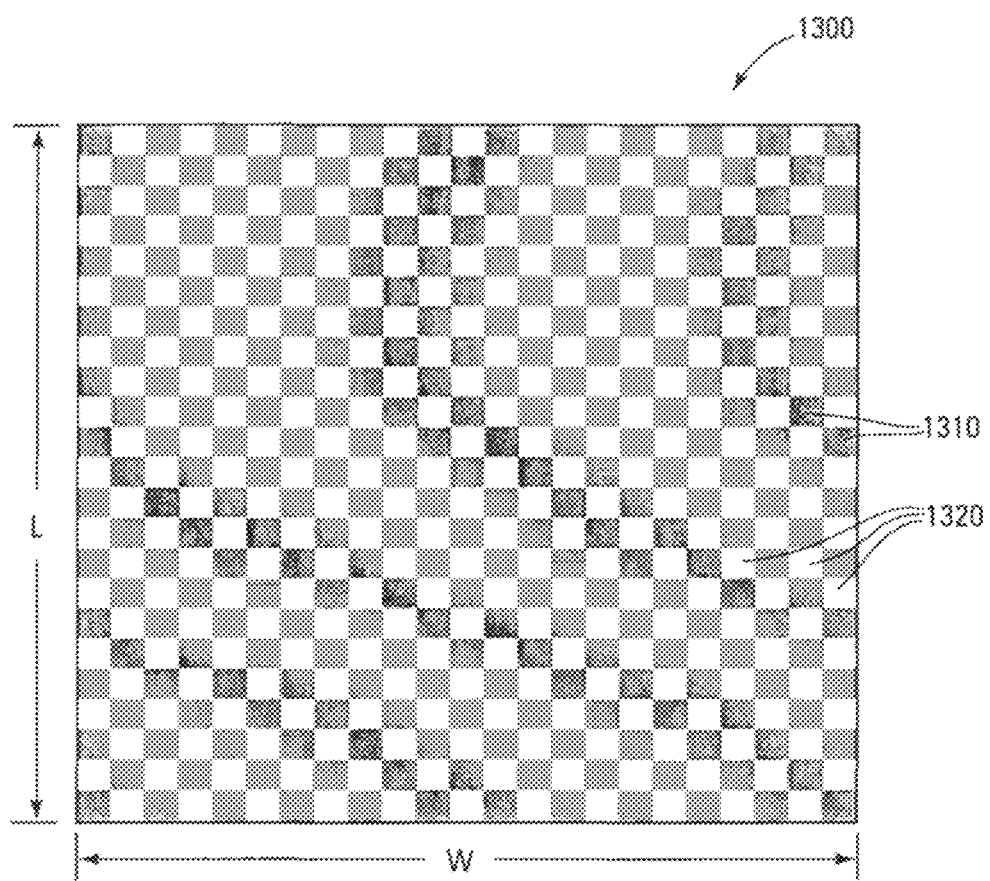
FIG. 13 is an example of a cropped region of an encoded data-bearing halftone image.

FIG. 13 is an example of a cropped region 1300 that could represent a captured portion of an encoded data-bearing halftone image, such as a stegatone. For example, region 1300 might correspond to region 110 in FIG. 1 and might be a portion of data-bearing medium 100. Region 1300 might include highlight modules (e.g., highlight cells) 1310 and shadow cells 1320. For example, each cell in region 1300 might correspond to a data-bearing element, such as a data-bearing symbol, e.g., that might encode one bit. For example, region 1300 may be L=23 symbols long and W=23 symbols wide.

In light portions of a data-bearing halftone image, the shadow cells 1320 might be completely white and thus unable to carry any beta, while the highlight cells 1310 might be rendered as small black clusters capable of carrying data by means of shifting, for example. In dark areas of a data-bearing halftone image, the highlight cells 1310 might completely black and unable to carry any data, while the shadow cells 1320 might be rendered as small white clusters that can carry data, for example. Therefore, in light areas or dark areas of a data-bearing halftone image no more than half of the cells (e.g., symbols) might encode data, for example.

Figure 14:
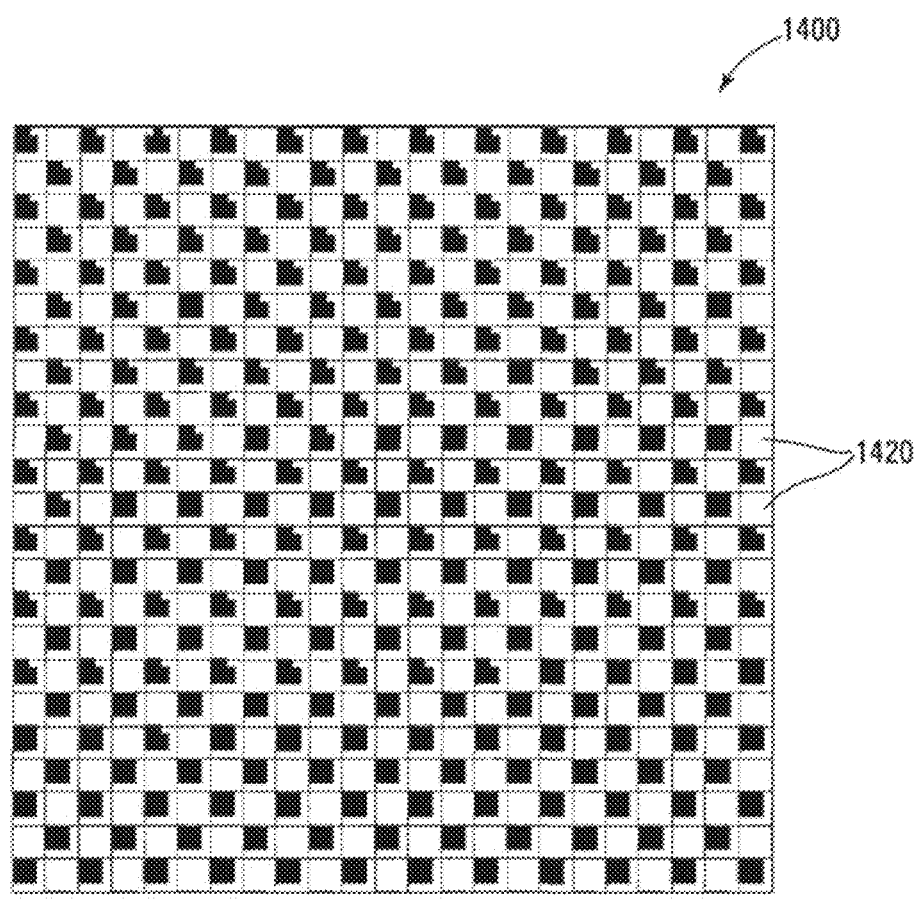
FIG. 14 is an example of a cropped region cropped from an all highlight portion of a data-bearing halftone image.

Using the halftone cell pattern in the example of FIG. 13, an all highlight region 1400 might be captured from an all highlight portion of a data-bearing halftone image, as shown in the example of FIG. 14, where the boundaries of the halftone cells are superimposed. For example, each of the shadow cells 1420 might be all white and thus incapable of carrying data.

Figure 15:
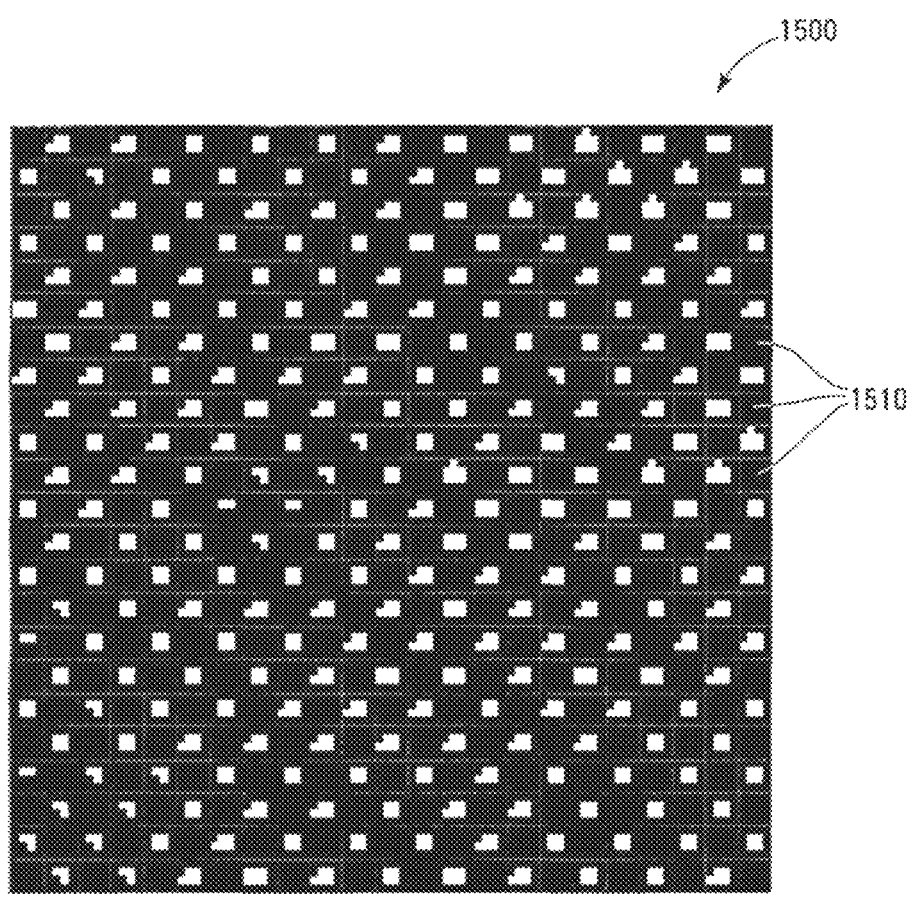
FIG. 15 is an example of a cropped region cropped from an all shadow portion of a data-bearing halftone image.

Using the halftone cell pattern in the example of FIG. 13, an all shadow region 1500 might be captured from an all shadow portion of a data-bearing halftone image, as shown in the example of FIG. 15, where the boundaries of the halftone cells are superimposed. For example, each cell highlight cell 1510 might be all black and unable to carry data.

Figure 16:
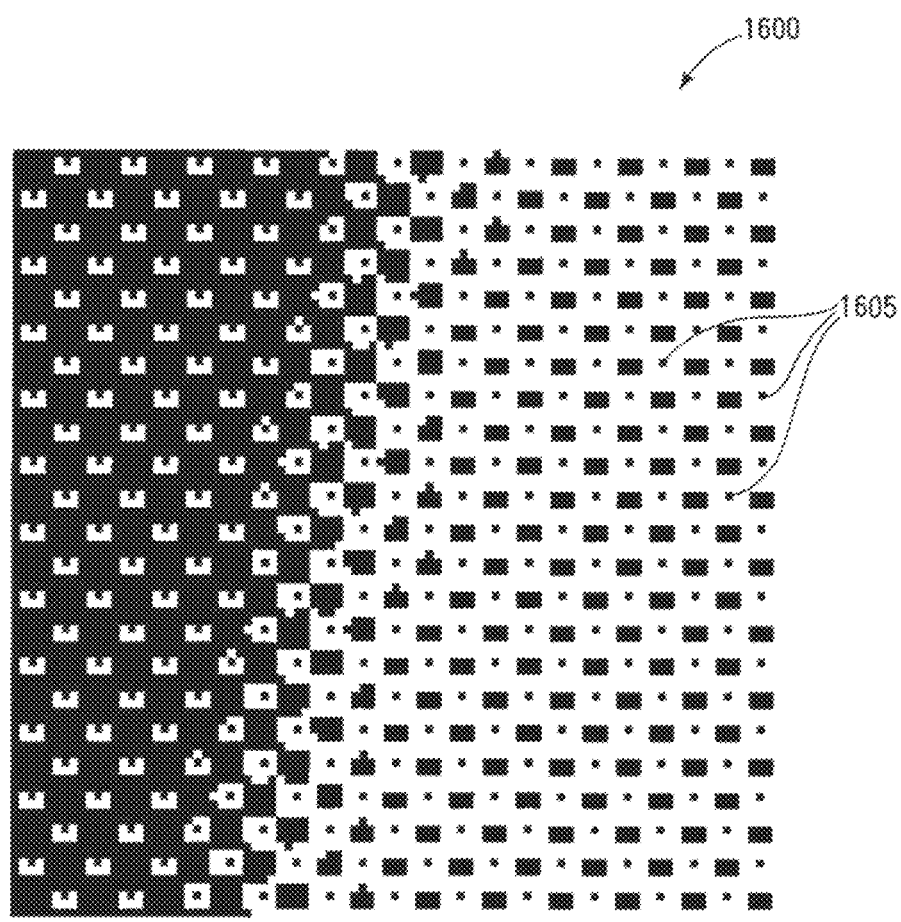
FIG. 16 is an example of a cropped region cropped from a portion of a data-bearing halftone image where both highlights and shadows occur.

It is also possible to capture a region 1600 from a portion of a data-bearing halftone image where both highlights and shadows occur, as in the example of FIG. 16. For example, in FIG. 15, instead of superimposing the cell boundaries a dot 1605 is shown in each of the shadow cells to show where cells are data bearing (e.g., small white clusters) and non-data bearing (e.g., solid white cells). For example, FIG. 16 demonstrates that one cannot rely on a checkerboard pattern to locate potential data bearing cells.

Note that for example, along with all white and all black cells, other cells might also be determined to be incapable of carrying data, so at most, for example, only half of the cells in a halftone data-bearing image might be available for carrying (e.g., encoding) data. For example, in the relation $NLW \geq BR$, N might be ½ or less. Note, for example, that cells that cannot encode data might be treated as abstentions in the examples discussed above in conjunction with FIGS. 4-6 and 11A-11D.

Figure 17:
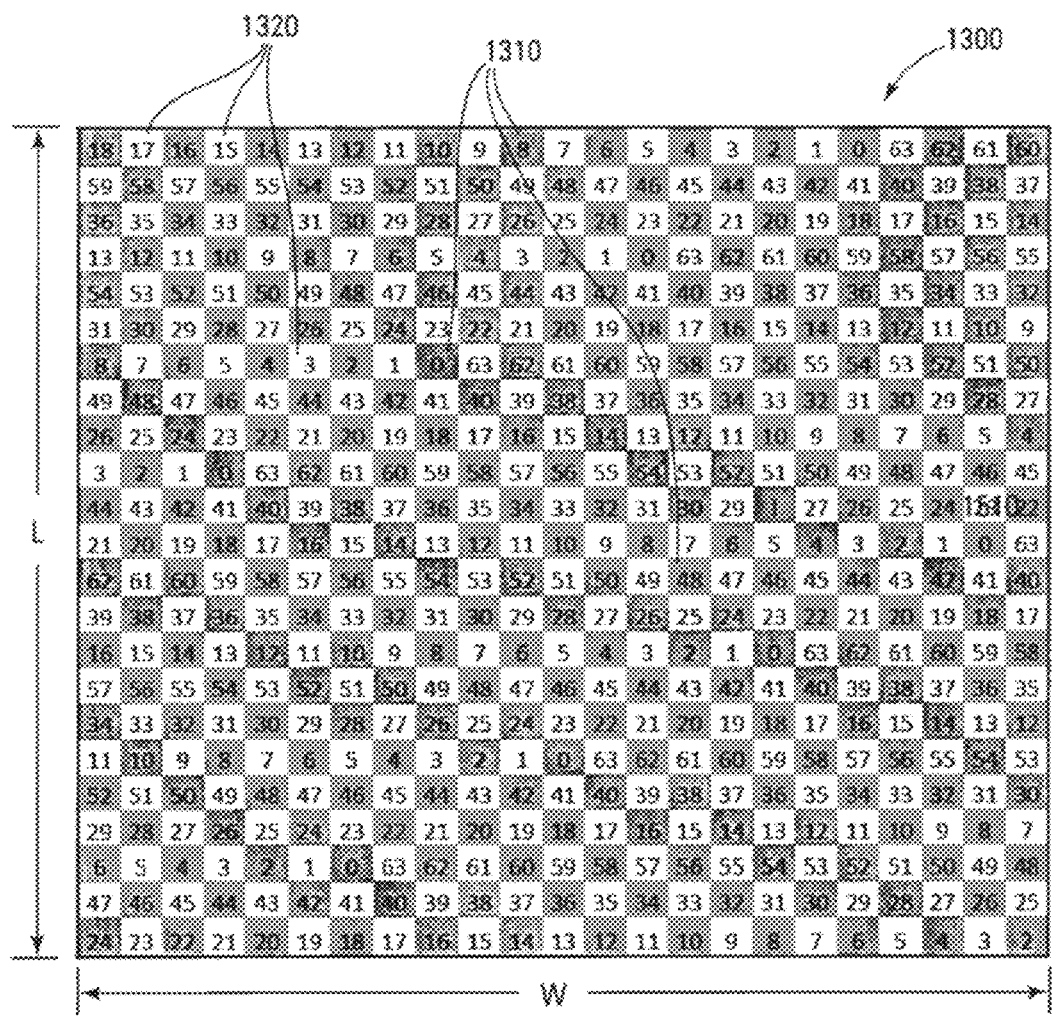
FIG. 17 is an example of a cropped region of a data-bearing halftone image with the bit positions of the encoded data superimposed thereon.

FIG. 17 illustrates the region 1300 from the example of FIG. 13 with bit positions superimposed on the highlight cells 1310 and the shadow cells 1320. For example, the numbers in the cells in FIG. 17 give the positions of the bits encoded in those cells. That is, the bit positions are the positions within an array of bits that may be obtained from decoded from region 1300, for example.

In the example of FIG. 17, the number of bits B in the payload (e.g., and thus at least a shifted version, such as the standard version of the payload) is 64 and the row-to-row right circular shift is 41. Note that since region 1300 has W=23 cells (e.g., symbols) in the row direction and L=23 cells (e.g., symbols) in the column direction, which is less than B, and there is one bit per cell, each row in FIG. 17 has 23 cells (e.g., symbols), which is less than B. This means, for example, that the number of symbols that encode the payload can exceed the number of symbols in the cropped region in the row and/or column direction, e.g., where each symbol encodes a bit. Therefore, the number of bits in the payload, and thus a shifted version of the payload, can be greater than or equal to the number of bits in the rows and/or columns in the array of bits that is decoded from region 1300, for example. Note that the number of symbols in a data-bearing medium that encode at least a shifted version of the payload can be greater than the number of symbols L in the column direction of a cropped region and/or the number of symbols W in the row direction of a cropped region.

Note that in the example of FIG. 17, the payload bit positions are $b_{63}$ to $b_0$, where only the subscripts are shown in FIG. 17. Note that all of the bit positions of the bits of the payload, and thus all of the bits of the payload, appear in array 1300. This means that array includes at least a shifted version of all of the bits in the payload, in spite of B being greater that both L and W.

If region 1300 is captured from a highlight portion of a data-bearing halftone image (e.g., as in FIG. 14), then all of the shadow cells 1320 are abstentions, and none of the odd bits are decodable, because all shadow cells will be solid white and thus cannot contain any data. If region 1300 is captured from a shadow portion of a data-bearing halftone image (e.g., as in FIG. 15) then all of the highlight cells 1310 are abstentions and none of the even bits are decodable, because all highlight cells will be solid black and thus cannot contain any data. These problems may persist whenever B is even.

Figure 18:
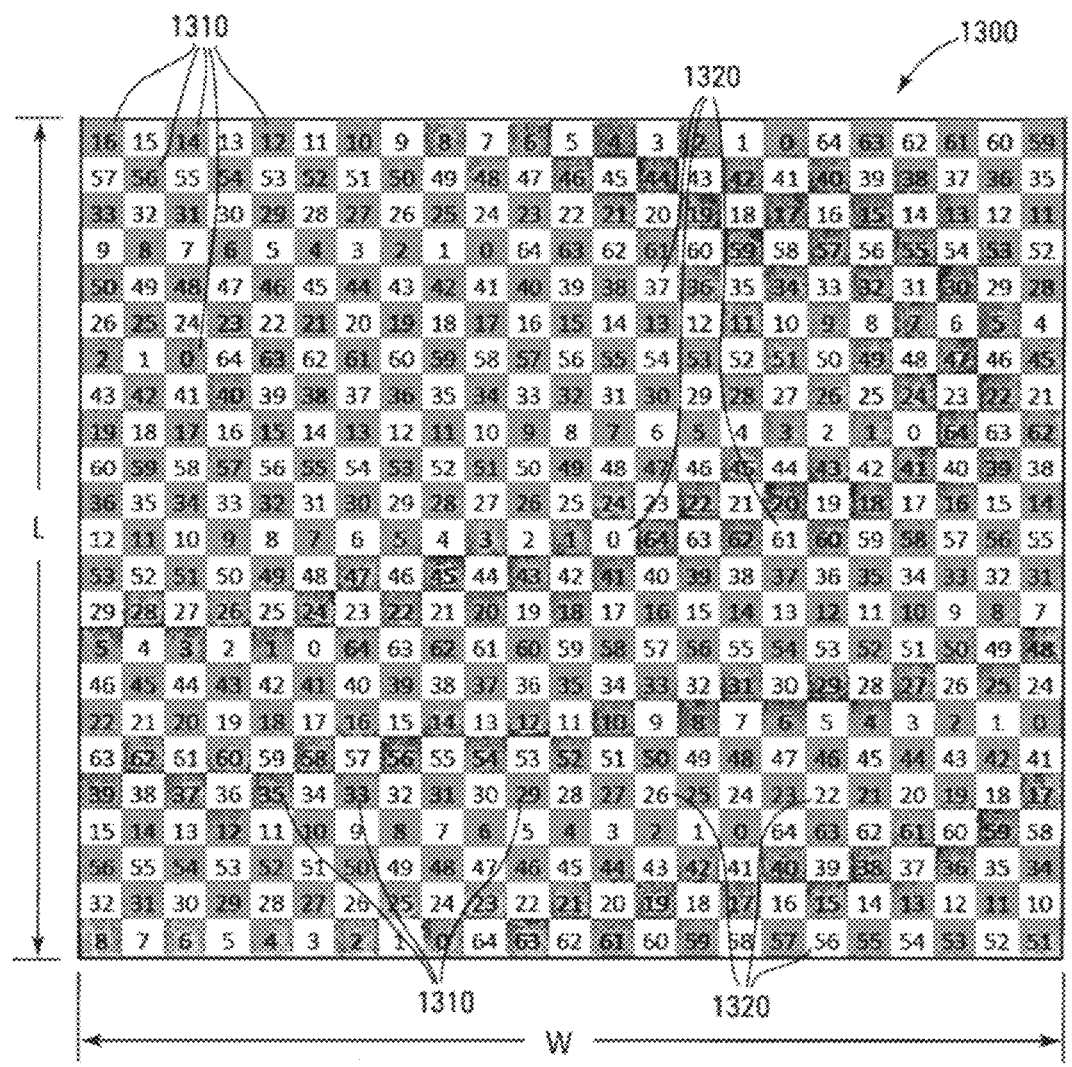
FIG. 18 is another example of a cropped region of a data-bearing halftone image with the bit positions of the encoded data superimposed thereon.

Therefore, B should be odd for some data-bearing halftone images, for example. Adding a bit to the payload (B=65), for example, can solve this problem, as shown in FIG. 18. That is, making B odd allows for both even and odd bits in the highlight cells 1310 and in the shadow cells 1320, as shown in FIG. 18, for example. For example, the odd number B of payload bits alone might work for all bits for the all shadow or all highlight cases if the crop region is large enough (e.g., the payload bits repeat a sufficient number of times) and the value of D is even.

Then, for example, the number of symbols in a repeating string of symbols in a data-bearing medium that encode at least a shifted version of the payload might be B and thus be odd. Further, the number of positions by which each row of symbols is right circularly shifted from the symbols of an immediately preceding row might be D and thus even, for example.

Note that in an all shadow or an all highlight area, no more than half of the cells in cropped region 1300 can encode data. So in an area of all shadow or all highlight, N might be ½, meaning that from the equality portion of NLW≥BR, the average number repetitions of each of the payload bits in FIG. 18 (e.g., for B=65, L=W=23) is R=(½)(23)(23)/65=4, e.g., meaning that the payload can be recovered from the cropped region 1300, where B>W and/or L.

Figure 19:
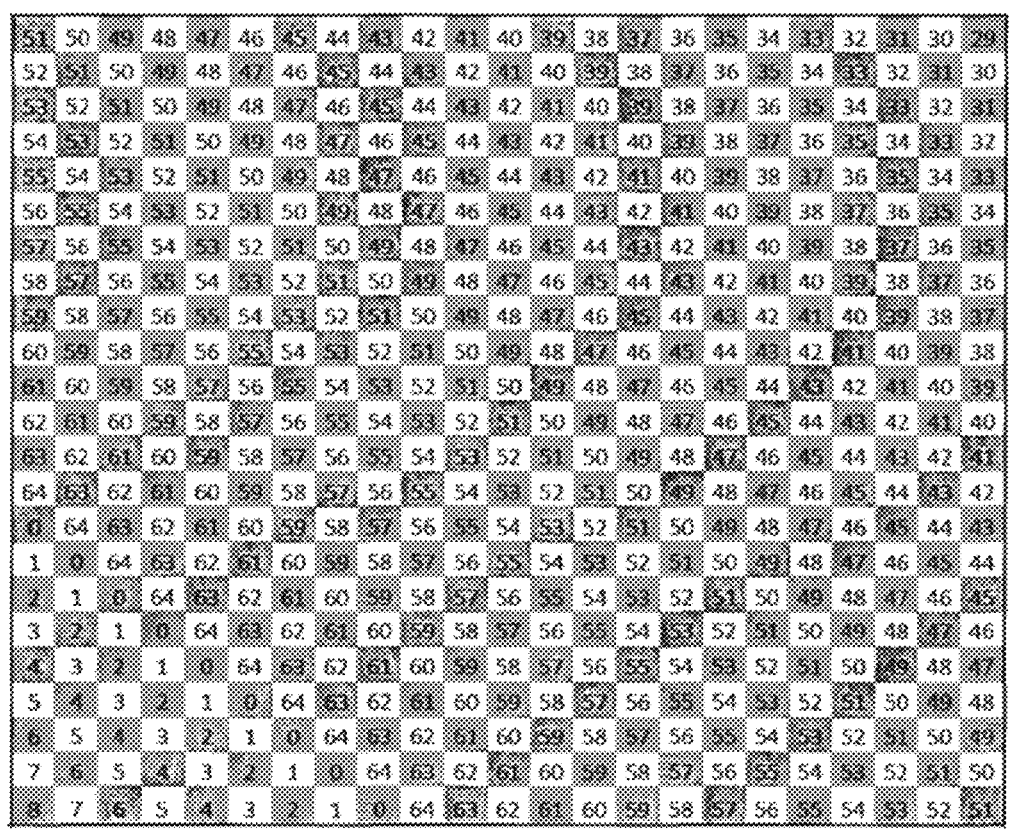
FIG. 19 is another example of a cropped region of a data-bearing halftone image with the bit positions of the encoded data superimposed thereon.

In the example of FIG. 19, the row- to row shift D is odd (e.g., 1) and does not work. This is because the bit positions 9 through 28 are absent, and half of the bits that are present might be abstentions in highlight or shadow portions of a data-bearing halftone image. Therefore, for example, for some data-bearing halftone images, D should be even.

Figure 20:
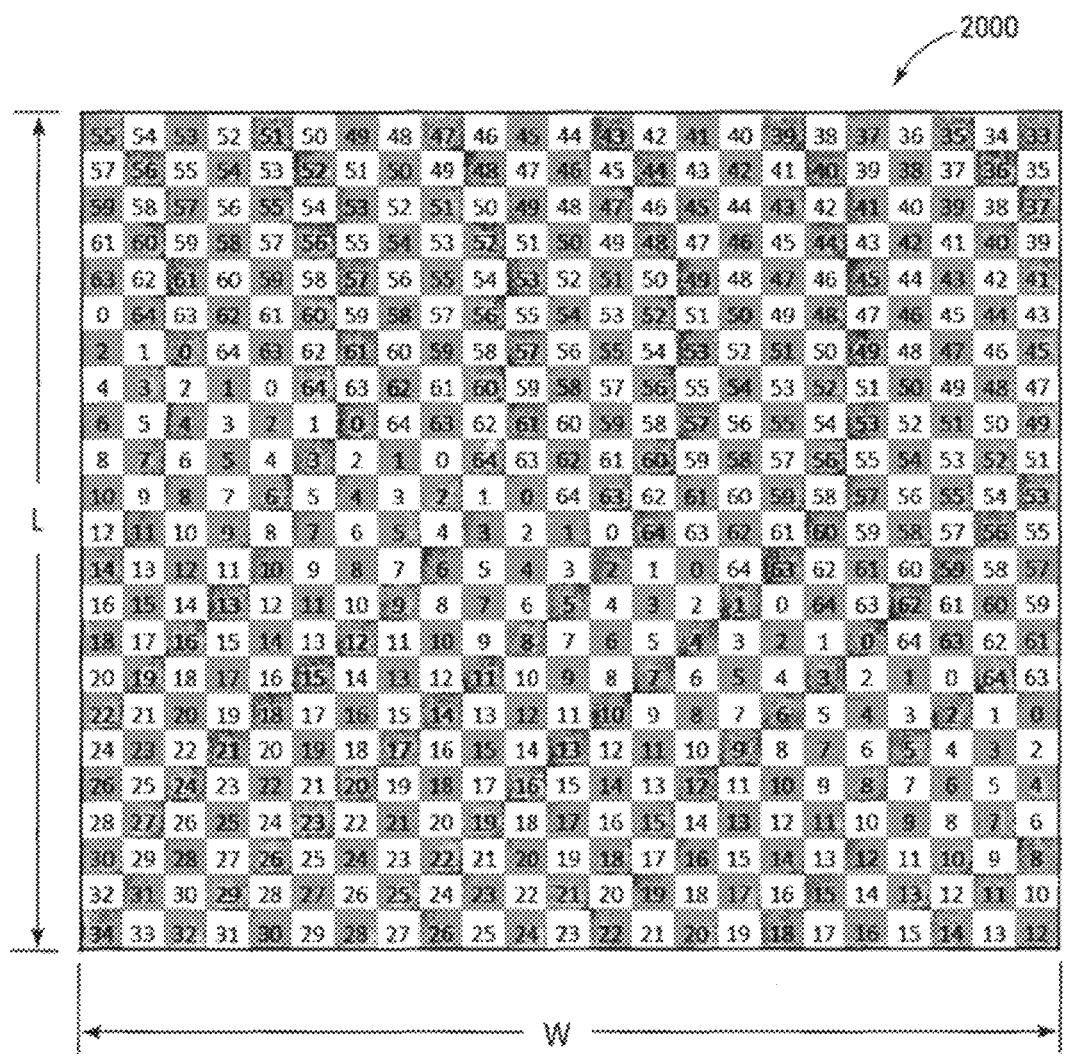
FIG. 20 is another example of a cropped region of a data-bearing halftone image with the bit positions of the encoded data superimposed thereon.

FIG. 20 illustrates an example of a cropped region, such as cropped region 2000, of a data-bearing halftone image (e.g., a stegatone), where B is odd and equal to 65 and D is even and equal to two. This is an example of a crop region from which the payload P can be recovered without capturing the entire data-bearing medium, according to the methods discussed above in conjunction with FIGS. 4-6 and 11A-11B. Note that ½ of the samples in FIGS. 11A-11D would be abstentions for cropped region 2000, for example, N in the expression NLW≥BR would be ½. Note further that the row-to-row shift D would be even, for example, because k in the expression D=kC would be two. Moreover, the number of payload bits B would be odd.

For data-bearing halftone images, such as stegatones, a row-to-row shift of D=0 (due to a right circular shift of C=0) might create vertical patterns in the resulting halftone and might result in an unrecoverable payload for small cropped regions. At the cost of one bit, this can be avoided, for example, by always setting the most significant bit of the payload to one. For example, this will force C to be non-zero as long as there is at least one zero bit in the payload, e.g., the standard version of the payload will always have a zero in the most significant bit, thereby forcing a non-zero C. Note that this will not happen when all bits of the payload are ones. For this one unusual case, all of the rows will be shifted the same way regardless of C.

Although specific examples have been illustrated and described herein it is manifestly intended that the scope of the claimed subject matter be limited only by the following claims and equivalents thereof.

What is claimed is:

1. A data-bearing medium, comprising:
   an array of data-bearing elements;
   wherein the array of data-bearing elements represents an array of bits;
   wherein a certain number of the bits repeat within the array of bits; and
   wherein position of the bits in each row of the array of bits are circularly shifted from positions of the bits in an immediately preceding row.

2. The data-bearing medium of claim 1, wherein the certain number of the bits comprises a circularly shifted version of a payload of the data-bearing medium.

3. The data-bearing medium of claim 1, wherein the positions of the bits in each row of the array of bits are circularly shifted from the positions of the bits in an immediately preceding row by a number of positions that is an integer multiple of a number of bit positions by which the bits in the certain number the of bits is shifted from bits in a payload of the data-bearing medium.

4. The data-bearing medium of claim 1, wherein the certain number of the bits comprises an odd number of the bits.

5. The data-bearing medium of claim 1, wherein the positions of the bits in each row of the array of bits are circularly shifted from the positions of the bits in an immediately preceding row by an even number of positions.

6. The data-bearing medium of claim 1, wherein the data-bearing medium comprises a data-bearing halftone image, a barcode, an atomic data-bearing medium, a magnetic data-bearing medium, a data-bearing image, or an optical data-bearing medium.

7. A method of automatically forming a data-bearing medium, comprising:
   forming a second string of bits from a first string of bits that is to be the payload of the data-bearing medium so that positions of the bits in the second string are circularly shifted from positions of the bits in the first string by a first circular shift;
   repeating the second string of bits in a two-dimensional array of bits;
   arranging the two-dimensional array of bits so that all positions of the bits in each row of the two-dimensional array of bits are circularly shifted in a same direction from positions of the bits in an immediately preceding row by a second circular shift that is an integer multiple of the first circular shift; and converting the two-dimensional array of bits to a two-dimensional array of data-bearing elements of the data-bearing medium so that the data-bearing elements encode the bits in the two-dimensional array of bits.

8. The method of claim 7, wherein the data-bearing elements comprise halftone clusters that are shifted in a certain way to encode their respective bits.

9. The method of claim 7, further comprising:
adding a bit to the first string to make a number of bits of the payload to be odd.

10. The method of claim 7, wherein the positions of the second string are circularly shifted an even number of positions from the positions of the bits in the immediately preceding row.

11. A method of automatically recovering a payload from a data-bearing medium, comprising:
decoding data-bearing elements in the data-bearing medium into an array of bits;
determining a version of the payload in bits from the array of bits and a circular shift corresponding to the version of the payload, the determining the version of the payload comprising:
determining a number of candidates for the version of the payload from a number of circularly shifted versions of the array of bits;
determining a level of confidence for each candidate; and
selecting the version of the payload to be the candidate with the highest level of confidence;
determining a standard form of the version of the payload; and
shifting the standard form of the version of the payload by the circular shift corresponding to the version of the payload to recover the payload in bits.

12. The method of claim 11, wherein each candidate comprises bits that are determined from an average of the bits in the circularly shifted version of the array of bits from which that candidate was determined.

13. The method of claim 11, wherein the circular shift corresponding to the version of the payload is an integer multiple of the circular shift of the circularly shifted version of the array of bits from which the candidate with the highest level of confidence was determined.

14. The method of claim 11, wherein determining the standard form of the version of the payload comprises determining all possible circularly shifted versions of the version of the payload and taking the circularly shifted version of the version of the payload with the lowest decimal value as being the standard form of the version of the payload.

15. The method of claim 11, wherein the payload comprises a number of bits that exceeds a number of bits in a row and/or a column of the array of bits.

16. The method of claim 11, wherein determining the level of confidence further comprises assigning an abstain label to a data-bearing element.

* * * * *

UNITED STATES PATENT AND TRADEMARK OFFICE
CERTIFICATE OF CORRECTION

PATENT NO. : 9,665,813 B2  
APPLICATION NO. : 14/654108  
DATED : May 30, 2017  
INVENTOR(S) : Robert Ulichney et al.

Page 1 of 1

It is certified that error appears in the above-identified patent and that said Letters Patent is hereby corrected as shown below:

In the Claims

In Column 16, Line 39, in Claim 3, delete "the of" and insert -- of the --, therefor.

Signed and Sealed this  
Fifth Day of September, 2017

Joseph Matal  
*Performing the Functions and Duties of the*  
*Under Secretary of Commerce for Intellectual Property and*  
*Director of the United States Patent and Trademark Office*